(12) United States Patent
Carlson et al.

(10) Patent No.: US 8,193,662 B1
(45) Date of Patent: Jun. 5, 2012

(54) POWER SUPPLY SOURCE BLENDING AND SMOOTHING

(75) Inventors: Andrew B. Carlson, Atherton, CA (US); Taliver Brooks Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/274,470

(22) Filed: Oct. 17, 2011

(51) Int. Cl.
H02J 7/00 (2006.01)
H02J 9/00 (2006.01)

(52) U.S. Cl. .................. 307/66; 307/23; 307/64
(58) Field of Classification Search .............. 307/23, 307/64–66, 86
See application file for complete search history.

(56) References Cited

U.S. PATENT DOCUMENTS

| | | |
|---|---|---|
| 3,757,131 A | 9/1973 | Krutz et al. |
| 4,809,151 A | 2/1989 | Ota |
| 5,119,014 A | 6/1992 | Kronberg |
| 5,458,991 A | 10/1995 | Severinsky |
| 5,579,522 A | 11/1996 | Christeson et al. |
| 5,694,307 A | 12/1997 | Murugan |
| 5,715,154 A | 2/1998 | Rault |
| 5,789,828 A | 8/1998 | Tremaine et al. |
| 5,821,636 A | 10/1998 | Baker et al. |
| 5,844,884 A | 12/1998 | Szlenski |
| 6,009,177 A | 12/1999 | Sudia |
| 6,076,142 A | 6/2000 | Corrington et al. |
| 6,157,168 A | 12/2000 | Malik |
| 6,225,708 B1 | 5/2001 | Furukawa et al. |
| 6,289,684 B1 | 9/2001 | Guidry, II et al. |
| 6,366,919 B2 | 4/2002 | O'Kane et al. |
| 6,374,627 B1 | 4/2002 | Schumacher et al. |
| 6,429,706 B1 | 8/2002 | Amin et al. |
| 6,496,366 B1 | 12/2002 | Coglitore et al. |
| 6,506,111 B2 | 1/2003 | Sharp et al. |
| 6,584,559 B1 | 6/2003 | Huh |
| 6,617,708 B2 | 9/2003 | Boost |
| 6,652,373 B2 | 11/2003 | Sharp et al. |
| 6,652,374 B2 | 11/2003 | Sharp et al. |
| 6,667,891 B2 | 12/2003 | Coglitore et al. |

(Continued)

FOREIGN PATENT DOCUMENTS

EP 1 355 404 10/2003
WO 2007/139577 12/2007

OTHER PUBLICATIONS

"Protect High-Density Equipment From Thermal Damage—Guaranteed," APC Currents, vol. 18, No. 4, Sep. 2007, 3 pages.

(Continued)

Primary Examiner — Jared Fureman
Assistant Examiner — Carlos Amaya
(74) Attorney, Agent, or Firm — Fish & Richardson P.C.

(57) ABSTRACT

The subject matter of this specification can be embodied in, among other things, a power distribution system that includes a DC bus configured to deliver operating power to a DC load, a conversion circuit configured to receive AC power and convert the received AC power to DC power that is provided to the DC bus, and a battery system configured to provide DC power from a battery to the DC bus. A controller determines an amount of DC power to be provided to the DC bus by the conversion circuit, determines an amount of DC power to be provided to the DC bus by the battery system, and controls the conversion circuit and the battery system such that the conversion circuit provides the first amount of DC power to the DC bus and the battery system concurrently provides the second amount of DC power to the DC bus.

30 Claims, 10 Drawing Sheets

U.S. PATENT DOCUMENTS

| | | | |
|---|---|---|---|
| 6,668,565 | B1 | 12/2003 | Johnson et al. |
| 6,741,467 | B2 | 5/2004 | Coglitore et al. |
| 6,768,222 | B1 | 7/2004 | Ricks |
| 6,822,859 | B2 | 11/2004 | Coglitore et al. |
| 6,824,362 | B2 | 11/2004 | Dodson, III |
| 6,850,408 | B1 | 2/2005 | Coglitore et al. |
| 6,859,366 | B2 | 2/2005 | Fink |
| 6,880,349 | B2 | 4/2005 | Johnson et al. |
| 6,935,130 | B2 | 8/2005 | Cheng et al. |
| 6,937,947 | B2 | 8/2005 | Trembley |
| 6,967,283 | B2 | 11/2005 | Rasmussen et al. |
| 6,969,922 | B2 | 11/2005 | Welches et al. |
| 6,985,357 | B2 | 1/2006 | Cauthron |
| 7,011,576 | B2 | 3/2006 | Sharp et al. |
| 7,123,477 | B2 | 10/2006 | Coglitore et al. |
| 7,145,772 | B2 | 12/2006 | Fink |
| 7,173,821 | B2 | 2/2007 | Coglitore et al. |
| 2003/0133263 | A1 | 7/2003 | Shu |
| 2003/0197428 | A1 | 10/2003 | Hatton et al. |
| 2003/0237008 | A1 | 12/2003 | Freevol et al. |
| 2004/0020224 | A1 | 2/2004 | Bash et al. |
| 2004/0150374 | A1 | 8/2004 | Kraus |
| 2004/0210800 | A1 | 10/2004 | Vecoven et al. |
| 2005/0012395 | A1 | 1/2005 | Eckroad et al. |
| 2005/0036248 | A1 | 2/2005 | Klikic et al. |
| 2005/0088201 | A1 | 4/2005 | Devlin |
| 2005/0099750 | A1 | 5/2005 | Takahashi et al. |
| 2005/0170770 | A1 | 8/2005 | Johnson et al. |
| 2005/0174678 | A1 | 8/2005 | Zayas et al. |
| 2005/0182981 | A1 | 8/2005 | Hayashi |
| 2005/0286191 | A1 | 12/2005 | Vorenkamp et al. |
| 2006/0020832 | A1 | 1/2006 | Hung |
| 2006/0082263 | A1 | 4/2006 | Rimler et al. |
| 2006/0187600 | A1 | 8/2006 | Brown et al. |
| 2007/0047195 | A1 | 3/2007 | Merkin et al. |

OTHER PUBLICATIONS

'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an_pk/3530, 3 pages.

'Intelligent Temperature Monitor and PWM Fan Controller' [online]. Analog Devices, 2003, [retrieved on Oct. 24, 2006]. Retrieved from the Internet: <URL: www.analog.com/UploadedFiles/Data_Sheets/ADM1030.pdf#xml=http://search.analog.com/search/pdfPainter.aspx?url=http://www.analog.com/UploadedFiles/Data_Sheets/ADM1030.pdf&fterm=Intelligent&fterm=Temperature&fterm=Intelligent Temperature&la=en>, 28 pages.

'LM64- +-1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.

'Low-cost fan manager for power-supply applications' [online]. Electronic Design, 2006, [retrieved on Oct. 23, 2006]. <URL: www.elecdesign.com/Articles/Index.cfm?ArticleID=6281>, 3 pages.

System Management Interface Forum, "PMBus Power System Management Protocol Specification Part 1-General Requirements, Transport and Electrical Interface, Revision 1.0" Mar. 2005, 17 pages.

'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spit/spi2r20b.pdf>, pp. 181-182.

Cringley, Robert, "Google-Mart: Sam Walton Taught Google More About How to Dominate the Internet Than Microsoft Ever Did," I, Cringely—The Pulpit, Nov. 17, 2005, 3 pages.

Greg Matter Weblog, the Industrial Revolution, Finally, available at: http://blogs.sun.com/Gregp/date/200610, Oct. 17, 2006, 5 pages.

Hamilton, James, "An Architecture for Modular Data Centers" Microsoft Corp,CIDR 2007. 3rd Biennial Conference on Innovative Data Systems Research (CIDR) Jan. 7-10, 2007, Asilomar, California, USA pp. 306-313.

Hamilton, James, "Commodity Data Center Design" Microsoft Corp, Apr. 17, 2007, 11 pgs.

Rackable Systems, "Rackable Systems Contcentro Modular Data Center High Density, High Efficiency Mobile Computing," Datasheet, 2007, 1 page.

Rackable Systems, "Thermal Management & Server Density: Critical Issues for Today's Data Center," White paper, 2004 8 pages.

Sanmina-Sci Product Sheet, ECOBAY, "High-Performance Closed-Loop System," 2006, 2 pages.

Shankland, Stephen, "Sun Blackbox, meet APC's whitebox," cNet News.com, available at http://news.com.com/Sun+Blackbox%2C+meet+APCs+whitebox/2001-1010_3-617774.html, Jan. 7, 2007, 2 pages.

Sun Project Blackbox-Index, Available at: http://www.sun.com/emrkt/blackbox/index.jsp, Retrieved Oct. 19, 2006, 3 pages.

Sun Project Blackbox-Scenarios, Available at: http://www.sun.com/emrkt/blackbox/scenarios.jsp, Retrieved Oct. 19, 2006, 7 pages.

JP Patent 11-225835, Kira et al., English translation, Aug. 24, 1990, 15 pages.

Guralp Systems, "Serial Server/UPS", Sep. 7, 2005, 11 pages.

Li, C., "Application of Automatic Changeover Switch in UPS Power Supply System," Financial Computing in China, No. 3, 2005, pp. 69-71.

Gu, S., "Distributed Monitoring System of Communication Power Supply," China Master Theses Full-Text Database, Information Technology Series, No. 3, 2003, pp. 7-8.

POWER SUPPLY SOURCE BLENDING AND SMOOTHING

TECHNICAL FIELD

This document relates generally to electrical power distribution.

BACKGROUND

In general, power distribution systems receive high voltage and/or high current electrical power from a utility provider, generator station, or other source of power. The power distribution systems may transform the received power to electrically powered equipment, such as the computers and cooling equipment in a data center. Electrical power is generally conducted by high current conductors that may be split into two or more branch conductors to divide and distribute electrical power. Some of these branches may be split to further divide and distribute electrical power. Each of the electrical conductors may be protected by circuit breakers, and/or other over-current protection devices to stop the flow of electrical currents in excess of the conductors' ratings.

Electrical devices are generally rated for a maximum current draw, and in some instances these ratings can be somewhat conservative. In addition, the electrical devices may only occasionally, if ever, draw their rated currents. In some instances, power distribution systems can be conservatively built to supply the devices' rated currents. The collective power of the devices connected to branches of the power distribution system may remain conservatively below the breaker limit for their respective branch, and the attached devices may not be drawing their maximum amount of power simultaneously. Overall, a power distribution system may leave some portion of the available power unused, and the amount of unusable power may increase as the number of power branches increases.

Operators of data centers also want to protect their electrical devices from black-outs and brown-outs. As a result, such operators may install uninterruptible power supplies (UPS's) that can both condition power and provide some level of battery back-up, either to keep a system operating throughout a power failure, or to give the system enough time to shut down safely and cleanly. In a large computer data center, such a UPS may condition power as it enters the data center, and may condition many megawatts of power.

SUMMARY

In general, this document describes the use of uninterruptable power supplies to level and smooth the amount of power that is drawn from an electric utility by controllably supplementing the utility power with power stored in the uninterruptable power supplies.

In a first aspect, a power distribution system includes a DC bus configured to deliver operating power to a DC load, a conversion circuit configured to receive AC power and convert the received AC power to DC power that is provided to the DC bus, a battery system configured to provide DC power from a battery to the DC bus, and a controller configured to determine a first amount of DC power to be provided to the DC bus by the conversion circuit, determine a second amount of DC power to be provided to the DC bus by the battery system while the first amount of DC power is provided to the DC bus by the conversion circuit, control the conversion circuit and the battery system such that the conversion circuit provides the first amount of DC power to the DC bus and the battery system concurrently provides the second amount of DC power to the DC bus.

Various implementations can include any, all, or none of the following features. The controller can be configured to determine the first amount, determine the second amount, and control the conversion circuit and battery system as part of transitioning between a first state in which the conversion circuit is not providing DC power to the DC bus to a second state in which the conversion circuit provides a third amount of DC power to the DC bus, the third amount being greater than the first amount. The controller can be configured to transition between the first state and the second state over a specified time period to prevent inrush currents from exceeding a predetermined level. The controller can be configured to determine the first amount, determine the second amount, and control the conversion circuit and battery system as part of transitioning between a first state in which the battery system is not providing DC power to the DC bus to a second state in which the battery system provides a third amount of DC power to the DC bus, the third amount being greater than the second amount. The controller can be configured to transition between the first state and the second state in response to an indication that a fault condition will occur in the received AC power. The controller can be configured to determine the first amount and the second amount such that the operating power delivered to the DC load is sufficient to maintain operation of the DC load while maintaining an amount of the AC power converted to DC power by the conversion circuit below a predetermined level. The controller can be configured to control the conversion circuit such that the conversion circuit provides the first amount of DC power to the DC bus by causing a power factor correction system in the conversion circuit to maintain current drawn from the received AC power below a predetermined level.

In a second aspect, a method is given for controlling a power distribution system that includes a DC bus configured to deliver operating power to a DC load, a conversion circuit configured to receive AC power and convert the received AC power to DC power that is provided to the DC bus, and a battery system configured to provide DC power from a battery to the DC bus. The method includes determining a first amount of DC power to be provided to the DC bus by the conversion circuit, determining a second amount of DC power to be provided to the DC bus by the battery system while the first amount of DC power is provided to the DC bus by the conversion circuit, and controlling the conversion circuit and the battery system such that the conversion circuit provides the first amount of DC power to the DC bus and the battery system concurrently provides the second amount of DC power to the DC bus.

Various implementations can include any, all, or none of the following features. The conversion circuit can be controlled such that the conversion circuit transitions from providing the first amount of DC power to providing a third amount of DC power to the DC bus, the third amount being greater than the first amount. The conversion circuit can transition from providing the first amount of DC power to providing the third amount of DC power over a specified time period to prevent inrush currents from exceeding a predetermined level. Prior to determining the first amount of DC power and determining the second amount of DC power, the conversion circuit can stop providing DC power to the DC bus. The battery system can be controlled such that the battery system transitions from providing the second amount of DC power to providing a third amount of DC power to the DC bus, the third amount being greater than the second amount. Determining the first amount of DC power and determining the second amount of DC power can be performed in response to an indication that a fault condition will occur in the received AC power. Prior to determining the first amount of DC power and determining the second amount of DC power, the battery system can stop providing DC power to the DC bus. The first amount and the second amount can be determined such that the operating power delivered to the DC load is sufficient to maintain operation of the DC load while maintaining an amount of the AC power converted to DC power by the conversion circuit below a predetermined level. The conversion circuit can be controlled such that the conversion circuit provides the first amount of DC power to the DC bus includes causing a power factor correction system in the conversion circuit to maintain current drawn from the received AC power below a predetermined level.

In a third aspect, a power distribution system, the system includes a plurality of DC buses configured to deliver operating power to a plurality of DC loads, a plurality of conversion circuits, each conversion circuit configured to receive AC power and convert the received AC power to DC power that is provided to a corresponding ones of the DC buses, a plurality of battery systems, each battery system including a respective battery and configured to provide DC power from the respective battery to a corresponding one of the DC buses, and a power coordinator configured to determine a total amount of DC power to be provided to the DC buses by the plurality of conversion circuits, determine a plurality of amounts of DC power to be provided to the DC buses by the battery systems while the total amount of DC power is provided to the DC buses by the conversion circuits, and control the conversion circuits and the battery systems such that the conversion circuits provide the total amount of DC power to the DC buses and the battery systems concurrently provide the plurality of amounts of DC power to the DC buses.

Various implementations can include any, all, or none of the following features. The power coordinator can be configured to determine the total amount of DC power and the plurality of amounts of DC power such that the operating power delivered to the DC loads is sufficient to maintain operation of the DC loads while maintaining an amount of the AC power converted to DC power by the conversion circuits below a predetermined level. The power coordinator can be configured to control the conversion circuits such that the conversion circuits provide the total amount of DC power to the DC buses by causing a plurality of power factor correction systems in the conversion circuits to maintain total current drawn from the received AC power below a predetermined level. The power coordinator can be configured to determine, for each of the plurality of conversion circuits, a respective first amount of operating power that is to be provided to the conversion circuits such that the operating power delivered to the DC loads is sufficient to maintain operation of the DC loads while maintaining an amount of the AC power converted to DC power by the conversion circuits below a predetermined level. The power coordinator can be configured to, in response to an increased operating power requirement for a first group of one or more of the conversion circuits, determine a magnitude of the increased power requirement, identify a second group of one or more other conversion circuits that are using less than their respective first amounts of operating power, and reallocate power from the second group to the first group such that the operating power delivered to the DC loads is sufficient to maintain operation of the DC loads while maintaining an amount of the AC power converted to DC power by the conversion circuits below a predetermined level.

In a fourth aspect, a method is given for controlling a power distribution system that includes a plurality of DC buses configured to deliver operating power to a plurality of DC loads, a plurality of conversion circuits configured to receive AC power and convert the received AC power to DC power that is provided to the DC buses, and a plurality of battery systems, each battery system including a respective battery and configured to provide DC power from the respective battery to a corresponding one of the DC buses. The method includes determining, by a power coordinator, a first total amount of DC power to be provided to the DC buses by the plurality of conversion circuits, determining a plurality of amounts of DC power to be provided to the DC buses by the battery systems while the first total amount of DC power is provided to the DC buses by the conversion circuits, and controlling the conversion circuits and the battery systems such that the conversion circuits provide the first total amount of DC power to the DC buses and the battery systems concurrently provide the plurality of amounts of DC power to the DC buses.

Various implementations can include any, all, or none of the following features. The conversion circuits can be controlled such that the conversion circuits transition from providing the first total amount of DC power to providing a second total amount of DC power to the DC buses, the second total amount being greater than the first total amount. The conversion circuits can transition from providing the first total amount of DC power to providing the second total amount of DC power over a specified time period to prevent inrush currents from exceeding a predetermined level. Prior to determining the first total amount of DC power and determining the plurality of amounts of DC power, the conversion circuits can stop providing DC power to the DC buses. The method may also include controlling the battery systems such that the battery systems transition from providing the plurality of amounts of DC power to providing a second total amount of DC power to the DC buses, the second total amount being greater than the plurality of amounts. Determining the first total amount of DC power and determining the plurality of amounts of DC power can be performed in response to an indication that a fault condition will occur in the received AC power. Prior to determining the first total amount of DC power and determining the plurality of amounts of DC power, the battery systems can stop providing DC power to the DC buses. The first total amount and the plurality of amounts can be determined such that the operating power delivered to the DC loads is sufficient to maintain operation of the DC loads while maintaining an amount of the AC power converted to DC power by the conversion circuits below a predetermined level. The conversion circuits can be controlled such that the conversion circuits provide the first total amount of DC power to the DC buses includes causing a plurality of power factor correction systems in the conversion circuits to maintain current drawn from the received AC power below a predetermined level.

The systems and techniques described here may provide one or more of the following advantages. First, a system can provide power to data center loads during power utility faults. Second, the system can provide power to data center loads during periods of reduced utility power availability. Third, the system can reduce the peak power ratings for utility service, thereby providing a financial savings derived from reduced electrical component costs and/or utility provider agreements. Fourth, the system can be used by the system operator to help a utility provider level overall peak power demands and help the utility provider satisfy overall power demands during utility faults, and these features may be used to obtain an advantageous financial agreement between the system operators and the utility provider.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
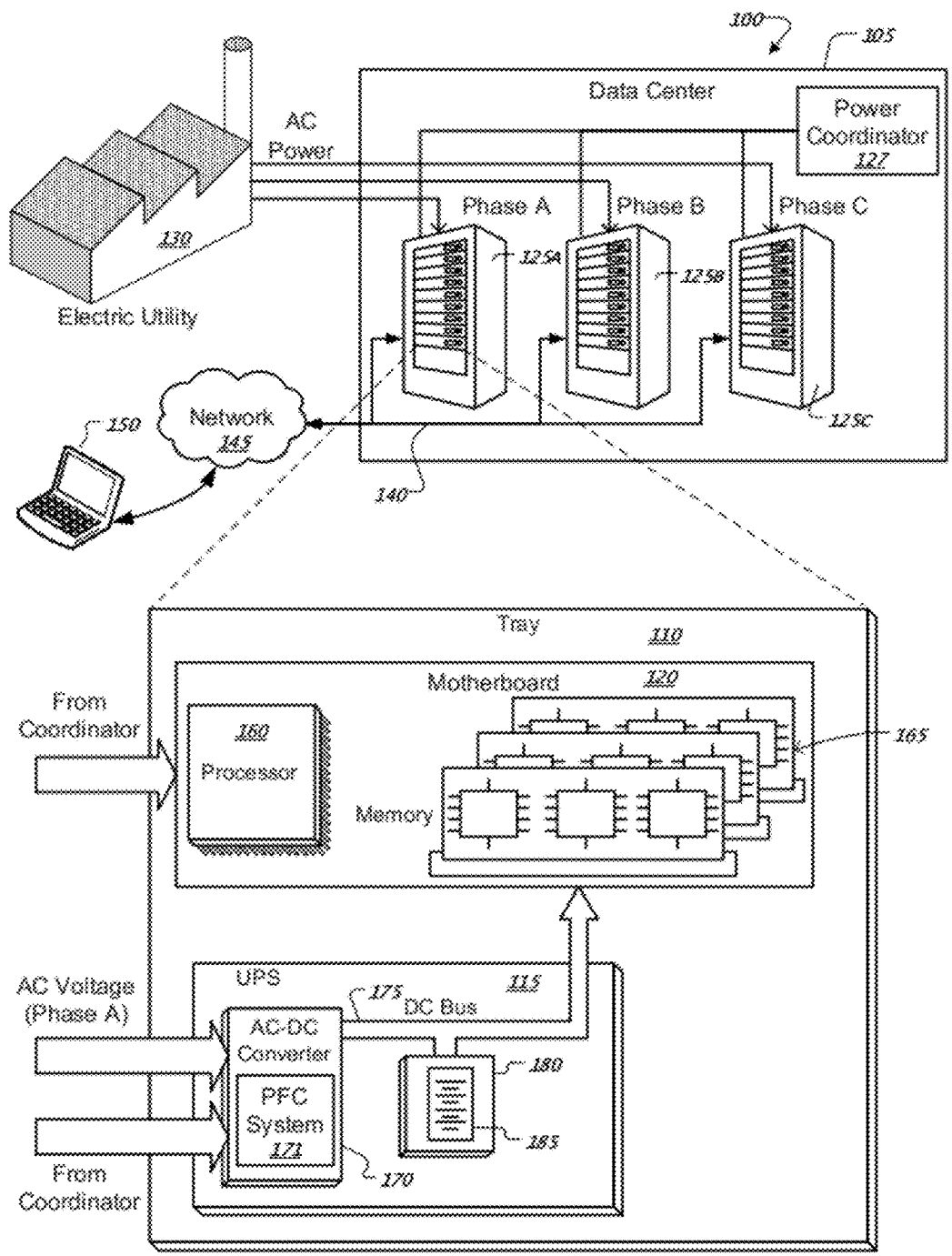
FIG. 1 is a schematic diagram illustrating an exemplary power distribution architecture for a data center in which each of a number of modular rack-mounted trays includes an uninterruptible power supply (UPS) operating to power components on a computer motherboard.

This document describes systems and techniques for leveling and smoothing the amount of power that is drawn from an electric utility by controllably supplementing the utility power with power stored in uninterruptable power supplies (UPS). In some applications, UPS power is used to replace utility AC power during periods of power interruptions. For example, when a brownout or blackout is detected, a power consuming load that draws utility power through a UPS is typically disconnected from the utility power and connected to draw power entirely from the UPS. As will be described below, a UPS system can be controlled to partly provide or supplement the utility power provided to a connected load. For example, half the load's operating power can come from the utility and half can come from energy stored in the UPS.

Such UPS configurations can be used to smooth or level the amount of power that is drawn by loads attached to the UPS, and by leveling the power draw the maximum power carrying capacity of various components of a power distribution system that supplies power to the UPS can be reduced. For example, many electrical devices exhibit high inrush currents (e.g., they can draw far more power during startup than they do during normal operation). Without power leveling, the electrical ratings of the power source, wires, busses, transformers, switches, circuit breakers, and other components used to deliver power to a load may need to be selected so as to accommodate the startup currents caused by the load. However, during normal operation, the capacities of the power components can exceed the load's normal draw. Such excess capacity can be costly in terms of equipment and service level agreements with utility providers.

In general, the power stored in UPSes can be used to supplement the utility power provided to an electrical load in order to smooth the load's overall current draw. For example, a server computer may draw 30% more power than normal for a brief period of time when it is powered up. Without smoothing, the utility power components used to supply the load may need to be selected to carry at least 30% more power than they need to during normal operation. By using smoothing power from the UPS, the utility power components can be selected to provide power levels that satisfy the power needs of the load during normal operation, and the UPS power can be controllably tapped to supply the temporary 30% startup inrush overage.

Similar techniques can be used to provide "soft start" functionality for electrical loads. For example, a computer data center or other large electrical load could potentially cause problems for a utility provider if its entire load were to be switched onto the utility grid (e.g., when power is restored after a blackout). In such situations, the inrush currents from the equipment switching back on may, in some instances, be sufficient to cause circuit breakers to trip, or cause other complications for the electrical system (including the utility grid). The computer data center, or portions thereof, can be started using battery system power, and then the battery systems can be controlled to gradually transition the power draw over a specified time period away from stored battery system power and toward utility power, thereby controlling the rate at which the data center presents its load to the utility grid. In some instances, this may be used to insure that the inrush currents remain below a predetermined level selected to prevent or reduce complications for the electrical system.

Similarly, a "soft switchover" functionality can be provided when the conversion circuit transitions from AC power to stored battery system power. The computer data center, or portions thereof, can be operating under utility power when an indication of an impending power failure is received (e.g., by sensing a change in the utility power, by receiving a message from the utility provider). In such an example, the battery systems can be controlled to gradually shift the power draw away from utility power and toward battery system power, thereby controlling the rate at which the data center presents its load to energy storage units such as batteries. In some instances, batteries and other such energy storage units may not react well to sudden electrical loads, and this "soft switchover" technique may be used to reduce the impact when the conversion circuit transitions from AC to stored battery system power to prevent or reduce complications for the energy storage units.

FIG. 1 is a schematic diagram illustrating an exemplary power distribution architecture 100 for a data center 105 in which each of a number of modular rack-mounted bases (which may also be referred to as trays) 110 includes an uninterruptible power supply (UPS) 115 operating to power components on a computer motherboard 120. Efficient power delivery may be achieved by configuring the UPS 115 (which could be repeated thousands or tens of thousands of times throughout the data center 105 at each computer or small group of computers) to perform the only AC-to-DC rectification that occurs between the AC mains power received from the electric utility grid and the DC power consumed by the motherboard 120. In this example, AC mains refers to the AC power source available at the point of use in the data center 105.

When received in the data center 105 at the UPS 115, the AC mains voltage is a substantially sinusoidal AC signal (e.g., 50 Hz, 60 Hz) that was generated, transmitted, and distributed by the electric utility. Such an AC mains voltage may be referred to as "substantially unconditioned," indicating that the AC mains does not have a traditional UPS system or other sort of traditional signal conditioning system with harmonic filtering, noise filtering, or sag protection. Substantially unconditioned AC power may, of course, pass through various circuits typically provided by an electric utility such as, for example, transformers, fuses, and surge protectors such as the typical metal-oxide or silicon-gapped surge arrestors provided by many electric utility providers or large generator systems. The AC mains input voltage is converted to a single DC voltage on a DC bus that delivers operating power to the motherboard 120. In the event of a fault on the AC mains, a battery circuit is electrically connected across the DC bus to supply operating power to the motherboard 120.

In the depicted example, the data center 105 includes a number of racks 125A, 125B, 125C that contain a number of the trays 110. The racks 125A-125C may be powered by three phase AC power that is delivered to the data center 105 from an electric utility 130. The AC power delivered to each of the racks 125A-125C may originate from a rotating generator operated by the electric utility and driven by a steam or gas turbine, for example. The AC voltage signals, which are substantially sinusoidal, may be transmitted to a distribution point, such as a substation (not shown) in the utility grid, for example. The power line voltages (e.g., 480 V line-to-line) may be distributed from the substation to the data center 105.

In the data center 105, individual phase voltages (e.g., 230 or 277 V line-to-neutral) are routed to the individual racks 125A-125C. Suitable AC-to-AC transformers (not shown) may be employed, as necessary, to deliver the AC power at a specified AC voltage. For example, step-down transformers may transform high voltage levels suitable for transmission to lower voltage levels that can be substantially directly applied to the UPS 115. In some three phase configurations, for example, such transformers may make appropriate transformations between WYE and DELTA connections if required.

In some implementations, the AC power signal received by the data center 105 is substantially unconditioned, containing a low power factor (e.g., a ratio between real power and apparent power) and harmonic components. For example, the electric utility grid may introduce harmonics and noise into the AC power signal. In some implementations, the UPS 115 receives the substantially unconditioned AC power signal to supply the motherboard 120 and/or other DC loads in the tray 110. In some implementations, the UPS 115 provides power to multiple trays such as the tray 110, to an entire rack such as the rack 125A, or to multiple racks.

Unless otherwise indicated, references to AC voltages are understood to refer to substantially sinusoidal voltages, and voltage amplitudes are understood to refer to root mean square (r.m.s.) values. The utility 130 may deliver substantially symmetric three phase voltages suitable for powering substantially balanced three phase loads.

The data center 105 includes a power coordinator 127. In some implementations, the data center 105 includes one or more power coordinators such as the power coordinator 127. In some implementations, the power coordinator 127 is communicatively connected to the motherboards 120 in the racks 125A-125C. For example, the power coordinator 127 may communicate with the motherboard 120 to analyze and control the amount of power consumed by the motherboard 120. In some implementations, the power coordinator 127 communicates with the motherboard 120 to determine the present power state (e.g., on, sleeping, low power) and/or computing load. For example, power consumption by the motherboard 120 may be related to the processing load of the motherboard 120. As such, the power coordinator 127 may determine that the motherboard 120 is operating at 50% of its processing capacity, and use that information to estimate that the motherboard 120 is drawing 2 A of current. The power coordinator 127 may, at another time, determine that the motherboard 120 is operating at 100% of its processing capacity, and use that information to estimate that the motherboard 120 is drawing 3 A of current.

In some implementations, the power coordinator 127 communicates with the motherboard 120 to alter the power consumption of the motherboard 120. For example, the power coordinator 127 may request the motherboard 120 to enter a reduced power consumption state. In another example, the power coordinator 127 may request the motherboard 120 to limit its processing load, which may also reduce the amount of power consumed by the motherboard 120.

In the depicted example, one phase voltage and a neutral line are distributed to each of the racks 125A-125C. The racks 125A-125C and trays 110 may be configured to form a substantially balanced load. In other implementations, a similar distribution may be used if the data center 105 included additional (or fewer) racks 125A-125C. As an example, the exemplary tray 110 (shown in magnified detail) in the rack 125A receives a phase A voltage and the neutral line. Each of the trays 110 in the rack 125A receives the same AC input voltage signal, namely the Phase A-to-neutral voltage.

Similarly, each of the trays 110 in the rack 125B receives a Phase B-to-neutral voltage signal as the AC input voltage signal, and each of the trays 110 in the rack 125C receives Phase C-to-neutral voltage signal as the AC input voltage signal. In other implementations, different phase voltages may be distributed among the trays 110 in one of the racks 125A-125C, and/or the AC input voltage signal to each of the trays 110 may be line-to-line voltages instead of line-to-neutral voltages. In various implementations, any practical number of phases (e.g., 1, 2, 3, 4, 5, 6, . . . 12 or more) may be distributed to provide operating power to individual trays 110.

Each of the trays 110 in the depicted example is coupled to a network connection 140. The network connection 140 provides an information channel to a network 145, which may include, for example, a local area network, virtual private network, wide area network (e.g., the Internet), or a combination of such networks, which may be wired, fiber optic, and/or wireless. A remote computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) may facilitate such communication. For example, the exemplary remote computer device 150 may be included in a server, a desktop computer, a laptop computer, and/or a handheld processor-based device. One or more servers may pre- or post-process, supervise, route, and/or balance the flow of data associated with the communication.

In various implementations, the motherboard 120 may include two, three, four, or any other practicable number of processors 160. In some implementations, the motherboard 120 may be replaced with or augmented by a tray of data storage devices (e.g., hard disc drives, flash memory, RAM, or any of these or other types of memory in combination). In such implementations, the UPS 115 with a battery system 180 may be integrated with the data storage devices and supported on the tray 110.

In various implementations, a digital processor may include any combination of analog and/or digital logic circuits, which may be integrated or discrete, and may further include programmable and/or programmed devices that may execute instructions stored in a memory. The memory 165 may include volatile and/or non-volatile memory that may be read and/or written to by the processor 160. The motherboard 120 may further include some or all of a central processor unit(s) (CPU), memory (e.g., cache, non-volatile, flash), and/ or disk drives, for example, along with various memories, chip sets, and associated support circuitry.

In some implementations, the motherboard 120 provides one or more DC-to-DC conversion circuits to convert the DC bus voltage to a suitable voltage for operating the circuitry in the motherboard 120. For example, one or more DC-to-DC conversion circuits may provide regulated output voltages, which may include, for example. a +3.3 VDC power signal, a +5 VDC power signal, a −5 VDC power signal, a +12 VDC power signal, and a −12 VDC power signal.

In an exemplary implementation, the processor 160 and the memory 165 on the motherboard 120 may form at least a part of a processing system configured to handle network operations. As an illustrative example, the motherboard 120 may help to process Internet requests. The motherboard may process information either alone or in combination with other parallel processes running on other processor-based devices, such as one or more other trays 110 in the data center 105.

An AC input voltage signal is delivered to each of the trays 110 to be processed by the UPS 115. In some examples, the AC input voltage signal may be received from the AC mains. The UPS 115 includes an AC-to-DC conversion circuit 170 that converts the AC input voltage signal to a regulated DC voltage. The conversion circuit 170 outputs the regulated DC voltage onto a DC bus 175.

AC-to-DC conversion circuit 170 rectifies AC power to DC power, and uses that rectified current to charge the battery system 180. In operation, the rectified current is controlled by a power factor control (PFC) system 171 to align power and current waveforms. The PFC system 171 has the ability to control the amount of current drawn from the AC mains on a cycle by cycle basis from a 50/60 Hz supply. The PFC system 171 includes logic and circuitry to limit the peak current drawn from the AC mains to a predefined value while making up the difference by drawing the remaining power required from the battery system 180.

In some implementations, the AC-to-DC conversion circuit 170 regulates the DC voltage to a static set point. In some other implementations, the set point may be dynamically determined. In some implementations, the set point is dynamically adjusted to provide a controlled ramping of the power that is drawn from the AC mains. In some of the static and dynamic implementations, the set point may be based on a characteristic of the battery. Examples of such set point regulation will be described in additional detail with reference to FIGS. 4-6.

In some implementations, the power coordinator 127 is communicatively connected to the AC-to-DC conversion circuit 170. For example, the power coordinator 127 may communicate with the AC-to-DC conversion circuit 170 to set the DC voltage set point. In some implementations, the power coordinator 127 uses a combination of communications with the motherboard 120 and the AC-to-DC conversion circuit 170 to control the amount of AC current that is drawn by the tray 110. For example, the power coordinator 127 may seek a temporary 3 A reduction in current draw from the tray 110 which may be consuming 5 A of current. The power coordinator 127 may request the motherboard 120 to reduce its computing load by 50%, and determine that the computing load reduction results in a 1.2 A reduction in current drawn by the tray 110. The power coordinator 127 may then command the AC-to-DC conversion circuit 170 to utilize stored DC power to supply 1.8 A to the tray 110 in order to achieve the target 3 A total reduction in current draw.

In some implementations, the AC-to-DC conversion circuit 170 uses the PFC system 171 to draw AC current that is more closely matched in phase to the AC voltage, thereby improving the power factor of the load. The AC-to-DC conversion circuit 170 preferably filters noise from the AC signal, reducing the noise power and allowing the DC circuitry to tolerate harmonic content and noise in the received AC power.

In some examples, the UPS 115 may receive AC power that is substantially unconditioned. For example, the received power may include noise and high harmonic distortion, and the power factor of the received AC power may be substantially less than one. In some implementations, the AC-to-DC conversion circuit 170 corrects the power factor of the input power to, for example, greater than 0.97 lagging (e.g., 0.98 leading). In such cases, the collective effect of multiple similar conversion circuits 170 provides a collective power factor improvement that is similar.

Using the PFC system 171, the AC-to-DC conversion circuit 170 may improve the electrical efficiency of the data center 105. For example, improving the power factor reduces current received by the AC-to-DC conversion circuit 170. By reducing the received current, the AC-to-DC conversion circuit 170 may reduce power loss and heat generated in the tray 110. Therefore, power efficiency of the data center 105 may be improved.

The AC-to-DC conversion circuit 170 may maintain voltage regulation on the DC bus 175 when the AC input voltage signal is in a normal range. A normal range for a typical sinusoidal AC signal may be specified in various ways. For example, one or more thresholds may be specified between about 80 V and 500 V for line frequencies that may be between about 40 Hz and 1000 Hz, such as around 50 Hz, 60 Hz, 100 Hz, 120 Hz, 180 Hz, 200 Hz, 300 Hz, 400 Hz, 500 Hz, . . . , and up to about 1000 Hz or more. As an illustrative example, for a 120 V nominal AC input voltage signal, a fault may be identified if the AC peak input voltage falls below a first threshold of 90 V in any half cycle, or if the r.m.s. voltage drops below a second threshold of 100 V for a predetermined amount of time.

Fault conditions may include, without limitation, blackouts, brownouts, voltage sags, surges, instabilities related to switchgear operation, or other electrical transient associated with the AC mains. In some implementations, a fault condition may cause, or potentially cause, improper operation of a processing unit in the DC load, for example, if the AC-to-DC conversion circuit 170 is unable to maintain adequate regulation of the voltage on the DC bus 175, and/or to supply sufficient current to operate the DC loads serviced by the DC bus 175.

If the AC input voltage signal falls outside of a normal range, such as during a fault condition, a detection circuit (not shown) may send a signal indicative of this condition. In response to detecting the fault condition, a battery system 180 may be configured to connect a battery 185 across the DC bus 175 so that the motherboard 120 can continue to operate substantially without interruption. The battery 185 may continue to provide operating power to the circuits on the motherboard 120 until the battery 185 substantially discharges. The battery system 180 may include circuitry capable of controlling the charging and/or discharging the battery across the DC bus 175 in various operating modes. For example, the battery system 180 may be controlled to at least partly supplement the DC power provided by the AC mains, through the AC-to-DC conversion circuit 170, to the DC bus 175 and to the motherboard 115.

In some implementations, the data center 105 includes up to or more than 100 trays. For example, the data center 105 may include more than 10,000 processor cores. In some examples, the data center 105 may execute more than 20,000 threads simultaneously. In certain implementations, the data center 105 may include an aggregate of more than 100,000 cores, 300 terabytes of memory and 3 petabytes of data storage. In other implementations, the data center 105 includes millions of cores and thousands of terabytes of memory and hundreds of petabytes of data storage.

In some examples, the data center 105 draws a large amount of power from the electric utility 130. For example, each server system in the data center 105 may consume 100 W-500 W of power. For example, each of the racks 125A-C may consume 2 kW to 30 kW of power. A small data center may provide, for example, 5000 processors, each having one or more cores. As processor technology improves, each processor or core may draw less power, but the number of cores per processor may increase. Larger data centers may employ many more processors, including 10,000, 20,000, 50,000, or even 100,000 processors. These may be distributed in racks having, for example, 20 to 200 processors or more per rack.

In some implementations, the AC-to-DC conversion circuits 170 of the data center 105 are configured to be capable of receiving substantially unconditioned power from the electric utility 130, which would be conditioned by the UPS 115 by substantially mitigating noise and harmonic contents. Also, the AC-to-DC conversion circuits 170 may prevent internally generated harmonic currents from entering utility network 130, as discussed above.

Figure 2:
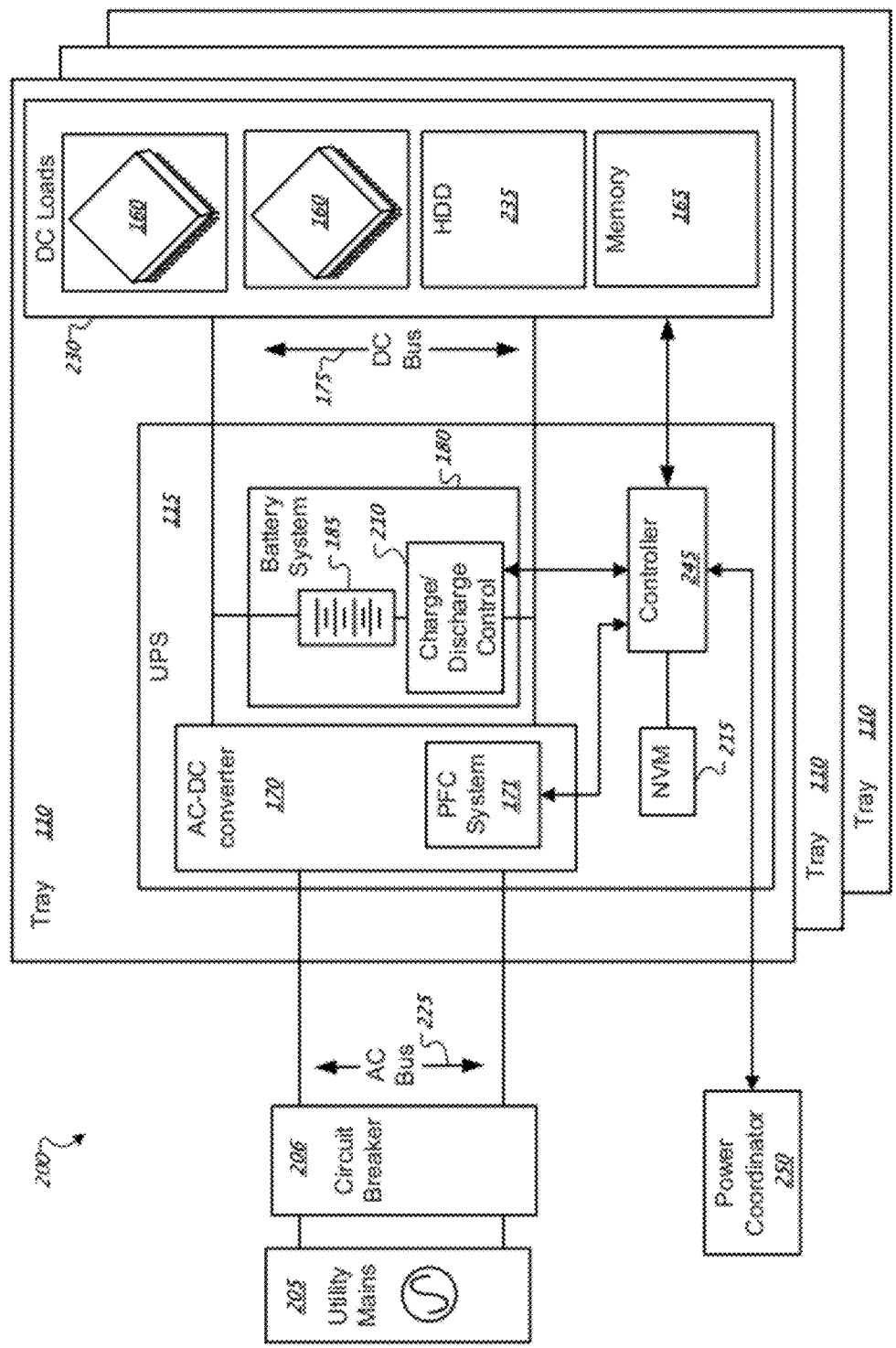
FIG. 2 is a block diagram that illustrates an example power distribution architecture for delivering power drawn from a utility main across an AC bus to operate a collection of DC loads that have processors.

FIG. 2 is a block diagram that illustrates an exemplary power distribution architecture 200 for delivering power drawn from a utility main 205 across an AC bus 225 to operate a collection of DC loads 230 that have a processor. In some implementations, the utility main 205 is wires or busses that conduct electrical power from a power provider, such as an electric utility, to the data center 105 of FIG. 1. The AC bus 225 conducts the electrical energy from the AC mains 205 to the AC-to-DC conversion circuit 170. A circuit breaker 206 protects the AC bus 225 by limiting the amount of electrical energy that is conducted by the AC bus 225. In some implementations, the circuit breaker 206 is configured to prevent the AC bus 225 from conducting electrical energy in excess of the power rating of the AC bus 225.

In various implementations, the AC-to-DC conversion circuit 170 may regulate the single output voltage on the DC bus 175 to a set point. The set point is a static value in some implementations, or it is dynamically controllable during operation. For example, the set point may be adjusted to at least partly supplement the amount of power provided to the DC bus 175 by power drawn from the utility main 205 across the AC bus 225.

Characteristics on which a set point can be established may include the amount of power that the utility mains 205 are capable of providing, by a predetermined AC power limit, by a predetermined AC power draw change limit (e.g., power ramp rate), by the power draw of connected loads under normal operations, by the power draw of connected loads under atypical operations (e.g., startup, exceptionally heavy load), or other parameters relating to the amount of power available to or drawn from the UPS 115. In some implementations, the predetermined AC power limit is set to limit the initial inrush current to a level comparable to the continuous power draw of the DC loads 205. In some implementations, the predetermined AC power limit includes a first predetermined current draw during an initial startup period and a second maximum current draw during operation. In some implementations, the PFC system 171 includes logic and circuitry to maintain AC power draw substantially at or below the predetermined AC power limit.

Characteristics on which a set point can be established may include battery characteristics such as battery chemistry, battery age, charge/discharge history, nominal maximum charge, temperature, charging profile (e.g., voltage charge rate under constant current), estimates of battery internal impedance, or other parameters relating to the electrical performance of the battery.

In addition to internal battery characteristics, the set point may be based at least in part on electrical circuit parameters of the battery system 180 and the DC bus 175. In some implementations, the set point to which the AC-to-DC conversion circuit 170 regulates the voltage on the DC bus 175 is a function of a battery charging circuit topology. If the battery charging circuit provides a voltage boost circuit (e.g., boost converter, charge pump, flyback), then the set point voltage may be substantially at or below a desired maximum charge voltage. If the battery charging circuit only provides a voltage step-down (e.g., linear regulator, buck converter) capability, then the set point can be set to a value sufficiently above the maximum nominal charge voltage to achieve the required charge performance over relevant temperatures, taking account of tradeoffs in power loss and charging current and corresponding charge time. In light of such trade-offs, the set point may be only as high as necessary to meet charge time specifications. For example, the set point may be set to between about 0.050 and about 1 Volt above the nominal expected battery voltage.

In various implementations, the set point voltage may be set based on a specified temperature, such as 0, 10, 25, 30, 40, 50, . . . , 80 degrees Celsius. In an illustrative example, the set point may be dynamically adjusted based on a temperature in or around the battery 185 as measured by at least one temperature sensor (not shown).

In the depicted implementation, the UPS 115 includes a charge/discharge control circuit 210 in series connection with the battery system 180, and further includes a controller 245 in operative connection with a non-volatile memory (NVM) 215, the collection of loads 230, the PFC system 171, and the circuit 210. In some implementations, the controller 245 communicates with the DC loads 230 to configure or retrieve information about the amount of power that the DC loads are drawing. For example, the controller 245 can communicate with the DC loads 230 to determine that the processor modules 160 are running at 70% of capacity, and from that information determine an estimate of the amount of power that the DC loads 230 is likely to require. In another example, the controller 245 can communicate with the processor modules 160 to establish a processor utilization limit. Other commands can place the DC loads 230 in a normal, low power, sleep, shutdown, or any other appropriate mode that can cause a change in the amount of power consumed by the DC loads 230. In another example, the controller 245 can communicate with the PFC system 171 to control the amount of power that is drawn across the AC bus 225. In some implementations, the controller 245 uses sensors to measure the current flowing through the AC bus 225 and compare that current against a power allocation value to control the AC-to-DC conversion circuit 170 and the battery system 180 to control the amounts and sources of power provided to the DC loads 230.

The series connected battery 185 and control circuit 210 are connected across the DC bus 175 as the battery system 180. Responsive to a signal indicative that the DC loads 230 are trying to draw an amount of power that exceeds a predetermined allocation value for the AC input voltage signal, the circuit 210 can operatively connect the battery system 180 across the DC bus 175 to permit the battery to variably and controllably discharge its stored energy to the DC loads 230 through a low impedance path to supplement or replace the AC input signal. When the AC input voltage signal on the AC bus 225 is not faulted, the circuit 210 may selectively permit charging current to flow from the DC bus 175 to charge the battery system 180. If multiple batteries or battery strings are connected in electrical parallel, individual strings or groups of strings may be independently charged at different rates according to a defined charging algorithm.

In the depicted implementation, the NVM 215 may store set point information for regulating the output of the AC-to-DC conversion circuit 170. The set point information may be stored during manufacturing time, upon first use, and/or dynamically updated during operation of the tray 110. The controller 245 and/or the AC-to-DC conversion circuit 170 may read and/or use the stored set point information to determine how to control the AC-to-DC conversion circuit 170. In addition to set point information, information about threshold conditions for controllably adjusting the power contributions of AC input and/or the battery system 180 to the DC bus 175 may be stored in the NVM 215, for example.

Access to information stored in the NVM 215 may be provided through a serial or parallel interface (which may have a wired and/or infrared physical layer), for example, between the NVM 215 and one or more processors 160 on the DC loads 230. The processors 160 may be used to access and/or update information in the NVM 215 via the network connections 140 (FIG. 1) to each tray 110.

Additional data storage devices may be provided on the DC loads 230. In the depicted example, the DC loads 230 includes two processors 160 in operative connection with the memory 165 and a hard disc drive (HDD) 235.

A power coordinator 250 is communicatively connected to the controller 245. The power coordinator 250 is configured to receive information from the controller 245 that indicates the amount of operating power that the DC load 230 is drawing, the amount of DC power being drawn from the battery system 180, and the amount of DC power being drawn from the AC-to-DC conversion circuit 170. The controller 245 is configured to receive the power allocation value from the power coordinator 250 to control the amount of power that is drawn across the AC bus 225 to power the tray 110.

In some implementations, the power coordinator 250 provides allocation values to multiple controllers 245 such that the operating power delivered to multiple DC loads 230 is sufficient to maintain operation of the DC loads 230 while maintaining an amount of the AC power drawn across the AC bus 225 by the AC-to-DC conversion circuit 170 below a predetermined level. For example, the AC bus 225 may be rated to carry 100 A of AC power, and the power coordinator 250 may be configured to allocate power among three trays 110 such that the first tray 110 draws 50 A, the second tray 110 draws 30 A, and the third tray draws 20 A. As such, the total power drawn by the three trays 110 (e.g., 100 A) does not exceed the 100 A rating of the AC bus 225. In some implementations, the DC loads 130 associated with the multiple trays 110 may exceed their respective tray's power allocation by drawing additional DC power from the tray's respective battery system 180 to satisfy the excess power demand.

In some implementations, the power coordinator 250 provides allocation values to multiple controllers 245 such that the operating power delivered to multiple DC loads 230 is reallocated to maintain operation of the DC loads 230 while maintaining an amount of the AC power drawn across the AC bus 225 by the AC-to-DC conversion circuit 170 below a predetermined level. For example, the AC bus 225 may be rated to carry 200 A of AC power, and the power coordinator 250 may be configured to allocate power among two trays 110 such that the first tray 110 draws 100 A, the second tray 110 draws 100A. In response to a notification from the controller 245 associated with the first tray 110 requesting an allocation of 110 A, the power coordinator 250 may query the controller 245 associated with the second tray 110 and determine that the second tray 110 is drawing 80 A of power from the AC bus 225. As such, the power coordinator 250 may reallocate 10 A from the second tray 110 to the first tray 110, thereby providing sufficient power for both trays 110 (e.g., 110 A and 90 A respectively) and maintaining the total amount of power drawn from the AC bus 225 below the 200 A rating.

Figure 3:
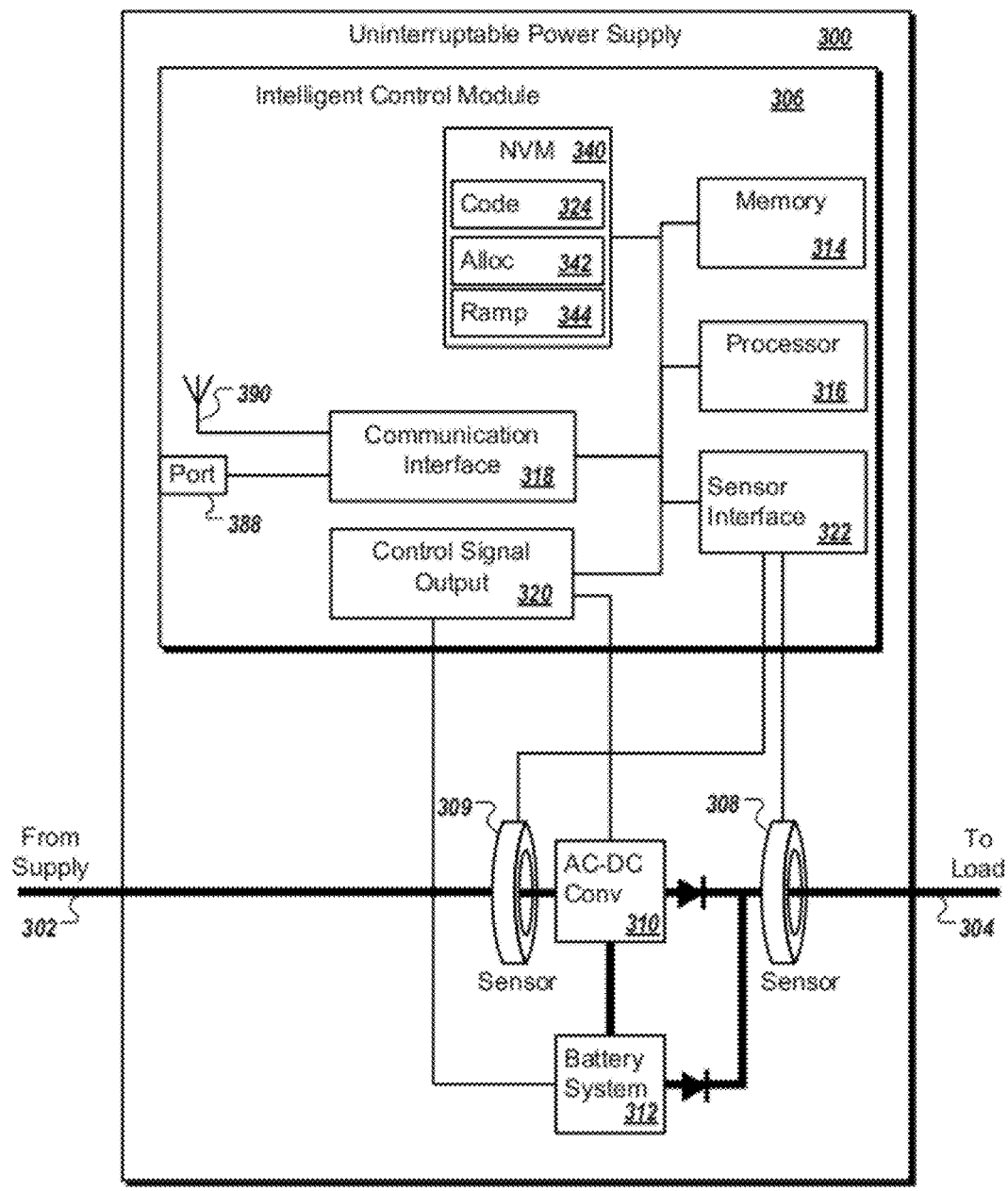
FIG. 3 shows a block diagram of an example of an intelligent uninterruptable power supply.

FIG. 3 shows a block diagram of an intelligent UPS 300. In some implementations, the UPS 300 is the UPS 115 FIGS. 1 and 2. The UPS 300 receives electrical current from a supply 302, and limits the amount of current that passes to an electrical load 304.

The UPS 300 includes an intelligent control module 306, a current flow sensor 308, a current flow sensor 309, an AC-to-DC conversion circuit 310, and a battery system 312. In some implementations, the sensor 308 is a transformer, a Hall Effect device, a resistor connected to a voltmeter, or other device that can output a signal that is proportional to the amount of current flowing through a conductor. In some implementations, the battery system 312 is any appropriate energy storage system (e.g., capacitor, flywheel, compressed or elevated fluid storage). The AC-to-DC conversion circuit 310 is controllable to limit the amount of power drawn from the supply 302 for conversion to DC power that is provided to the load 304. For example, the AC-to-DC conversion system 310 can include the PFC system 171 to control the amount of power drawn across the conductor 302. In some implementations, the battery system 312 includes a DC power storage module (e.g., a battery, capacitor, flywheel motor generator) and a charge/discharge control that is controllable to limit the amount of power ultimately drawn from the supply 302 (e.g., for recharging the DC power storage module) or to controllably regulate the amount of power provided to the load 304.

In general, the intelligent control module 306 uses the sensors 308 and 309 to measure the amount of current passing through the UPS 300. The intelligent control module 306 compares the measured currents against a power allocation value and controls the AC-to-DC conversion circuit 310 and the battery system 312 to control the amounts and sources of power provided to the load 304. In some implementations, the UPS 300 communicates with other UPSs or an information management system to raise and/or lower its allocation in response to changes in sensed current flows, requests from other UPSs and/or the information system, and/or other conditions that can cause an UPS to change its power allocation.

The intelligent control module 306 includes a non-volatile memory (NVM) 340, a memory 314, a processor module 316, a communications interface module 318, a control signal output 320, and a sensor interface 322. The processor module 316 accesses the NVM 340 to read and execute a set of computer code modules 324. Example processes performed when the code modules 324 are executed are discussed in further detail in relation to FIGS. 4-6. The processor module 316 also accesses the NVM 340 to retrieve stored power allocation limits, power source changeover rates, configuration values, startup parameters, and other appropriate information.

The sensor interface 322 receives signals from the sensors 308, 309 and provides an output that can be used by the processor 316. In some examples, the sensor interface 322 can be an analog to digital converter. For example, the sensors 308, 309 can output analogs signal that is proportional to the currents that passes through the sensors 308, 309. The sensor interface 322 converts the analog signals to digital values that can be used by the processor 316.

An allocation value 342 includes a value that represents the amount of power that the UPS 300 is allocated to draw from the supply 302. For example, the allocation value 342 can be set to 100 A. When the amount of current passing through the UPS 300 is sensed to be equal to or greater than the allocated amount, the UPS 300 can satisfy the overage by supplying supplemental power from the battery system 312. In some implementations, the code 324 is configured to control the DC power system to provide additional allocations when the measured current is anticipated to reach the allocated value 342. For example, the UPS 300 can pass 90 A of a 100 A allocation, but successive current flow measurements can indicate that current usage is rising at a rate of 1 A per second. The processor 316 and the code 324 can be used to determine that the UPS 300 has approximately ten seconds to preemptively supply additional allocations from the battery system 312 in an attempt to avoid a possible over-current condition.

In some implementations, the code 324 is configured to shift the power contributions of the AC-to-DC conversion circuit 310 and the battery system 312 at a rate described by the ramp rate value 344. For example, during a blackout the UPS 300 may power the load 304 with 75 A provided entirely from the battery system 312. Once power to the supply 302 is restored, the processor module 316 may read the ramp rate value 344 to determine a value of 0.1 amps per minute, and control the AC-to-DC conversion circuit 310 to begin ramping up its power contribution from 0 A to 75 A at a rate of 0.1 A/min, and substantially simultaneously ramp down the DC power system's 312 power contribution to the load 304 from 75 A to 0 A at a rate of 0.1 A/min. In other implementations, the power contributions can be shifted from the AC-to-DC conversion circuit 310 to the battery system 312 at the rate stored as the ramp rate value 344.

The control signal output 320 connects the intelligent control module 306 to the AC-to-DC conversion circuit 310 and to the battery system 312. In some implementations, the control signal output 320 responds to a command or signal from the processor module 316 and output a corresponding command or signal to control the amount of power that is allowed to pass through the AC-to-DC conversion circuit 310. In some implementations, the control signal output 320 responds to a command or signal from the processor module 316 and output a corresponding command or signal to control the amount of power that is provided to the load 304 by the battery system 312. For example, the control signal output 320 can be a protocol converter that converts messages between the processor module's 316 format and a communications format to which the controlled conversion circuit 310 is configured to respond (e.g., RS232, RS422, RS485, USB, Ethernet, CAN, PROFIBUS, DeviceNet). In some implementations, the control signal output 320 provides a digital output that can change the amount of power that the AC-to-DC conversion circuit 310 passes from the supply 302 to the load 304. In some implementations, the control signal output 320 provides a digital output that can change the amount of power that the battery system 312 provides to the load 304. For example, the processor module 316 may determine that the supply is currently providing 40 A out of a 50 A supply limit, and determine that the load 304 needs to draw 60 A. As such, the processor module 316 can send commands to the control signal output 320 indicating that the AC-to-DC conversion circuit is to increase its power draw to 50 A, and that the DC power system is to provide a supplemental 10 A to the load 304. The control signal output 320 can respond by translating and/or relaying the commands from the processor module 316 to the AC-to-DC conversion circuit 310 and the battery system 312.

In some implementations, NVM 340 also includes configuration values such as network addresses of the UPS 300, information management systems, or other devices. The configuration values can also include timeout, and/or device rating values (e.g., the maximum current rating of the UPS 300). For example, the configuration values can include a value that describes the interval that the UPS 300 should wait for a response to messages sent to other UPSs and/or the information management systems before timing out. In some implementations, the UPS 300 can time out to avoid blocking a process in the code modules. For example, the UPS 300 can send AC power allocation requests and then wait 5 seconds for the responses to come back before proceeding. In some implementations, the UPS 300 can time out to detect that an information management system is unavailable. For example, the UPS 300 can send an allocating request to the information management system of a centrally-coordinated power distribution system and wait 10 seconds for a response before switching over to a peer-to-peer allocation negotiation process.

The communication interface module 318 converts communications between a format that the processor module 316 can use and a protocol and/or medium that can be used to communicate with other UPSes, the information management systems, a user terminal, and/or other external devices. For example, the communication interface module 318 can be a transceiver for wired and/or wireless Ethernet, power line communications, Bluetooth, ZigBee, RS232, RS422, RS485, USB, CAN, PROFIBUS, DeviceNet, and/or other protocols. The communications interface module 318 is communicably connected to a communications port 388 and/or an antenna 390 that can be used to connect the communication interface module 318 to wired and/or wireless communications media.

Figure 4:
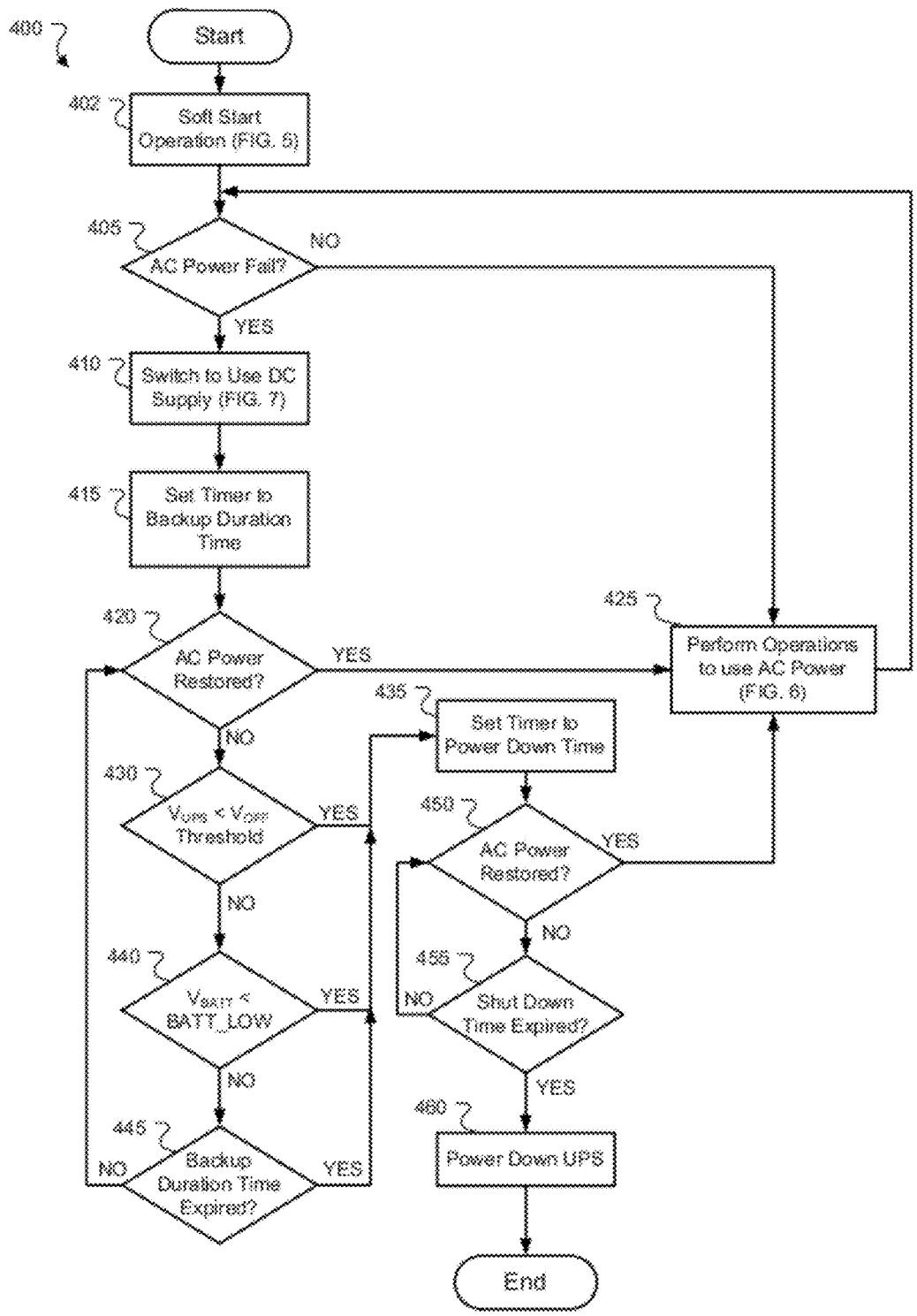
FIGS. 4-9 are flow diagrams illustrating exemplary processes that may be performed in implementations of the power distribution architecture.

FIG. 4 is a flow diagram illustrating an exemplary process 400 that may be performed in implementations of the power distribution architecture. For example, the process 400 may be performed by the UPS 115 or 300. In some embodiments, the UPS 115 or 300 may perform the method to coordinate switchover to and/or from the battery as a temporary supplemental power source. In some cases, performing the process 400 may be used to smooth or level the variability in the amount of power drawn from an AC source. For example, during initial power-up, the DC loads 230 may require far more current than the DC loads 230 would use under normal runtime conditions. In such a case, the battery system 180 may provide supplemental operating power to maintain operation of the DC loads 230 until the power needs of the DC loads 230 drops below the amount of power available from an AC source, such as the utility mains 205 or backup generators. In some implementations, the battery system 180 provides operating power to substantially replace the amount of power provided by the AC mains 205 to the DC loads 230 during an AC fault, such as a blackout.

Generally, the process 400 includes operations that may be performed by a controller (e.g., the controller 245). The operations may further be performed under the control, supervision, and/or monitoring of one or more of the processors 160 in the system 100. Operations may also be supplemented or augmented by other processing and/or control elements that may be in operative communication with the controller through a network connection coupled to the tray 110. The processing may be implemented using analog and/or digital hardware or techniques, either alone or in cooperation with one or more processors executing instructions.

The process 400 begins at operation 402 with a "soft start" operation. For example, suddenly "dropping" an electrical load onto a power main can cause unwanted local or remote power side effects, and to avoid such effects the amount of power drawn from the power main may be ramped up gradually over a specified time period. Such a soft state operation can be used to limit the inrush currents from the data center to prevent inrush currents from exceeding a predetermined level selected to prevent or reduce complications on the utility grid. This process will be discussed further in the description of FIG. 5.

A determination of whether there is an AC power failure is made at operation 405. If the controller determines that no AC power failure is occurring, then operations to use AC power are performed at operation 425. For example, the ICM 306 may use the sensor 309 to receive an indication that no current is flowing from the supply 302, and determine that a blackout is happening. In other examples, the controller may receive an indication of the occurrence of AC power failures by monitoring, for example, the AC bus 225, a voltage status condition signal provided by a voltage monitoring/fault detection circuit on the tray 110, and/or an output voltage (e.g., VUPS in FIG. 5A) at the DC bus 175. In other examples, the controller may receive a notification of an impending power problem from the utility provider. If an AC power failure is occurring, then the conversion circuit transitions to use a DC power supply at operation 410. For example, UPS 300 may switch over from supply 302 power to power drawn from the Battery system 312. Operations for performing such a switchover will be discussed further with respect to FIG. 7.

At operation 415, a timer is set to the backup duration time. For example, the ICM 306 may determine, based upon the charge state of the battery system 312, the amount of power available from the supply 302, the power consumption of the DC loads 230, and/or other appropriate factors, a duration of available DC power.

At operation 420, if the controller determines that AC power has been restored, then operations to use AC power are performed at operation 425. If AC power has not been restored, then a sequence of determinations is made starting at operation 430. At operation 430, the controller checks whether VUPS is less than a minimum voltage for battery backup (VOFF). If the controller determines that VUPS is less than VOFF, then the controller may set the timer to a power down time in operation 435. For example, the power down time may be an estimation of the time required for the DC loads 230 to perform the power down operations. In some examples, the power down operations of the DC loads 230 may prevent data loss and/or avoid damage due to sudden loss of DC power. If, in operation 430, the controller determines that VUPS is not less than VOFF, then, in operation 440, the controller may determine whether an output voltage of the battery (VBATT) is less than a battery low threshold (BATT_LOW). In some implementations, when VBATT is lower than BATT_LOW, it may indicate that the power stored in the battery is low and proper power down operations may be executed to prevent data loss, for example. If the controller determines that VBATT is less than BATT_LOW, then the operation 445 is performed. If the controller determines that VBATT is not less than BATT_LOW, then the controller may check whether the backup duration time is expired. If the controller determines that the backup duration time is expired, then the operation 435 is performed. If the controller determines that the backup duration time is not expired, then the operation 420 is repeated.

After the controller sets the timer to the power down time in operation 435, the controller may check whether the AC power is restored in operation 450. If the controller determines that the AC power is restored, then the operation 425 is performed. If the controller determines that the AC power is not restored, then the controller determines whether the power down time is expired in operation 455. If the controller determines that the power down time is not expired, then the operation 450 is repeated. If the controller determines that the power down time is expired, then the controller may, in operation 460, power down the UPS and the method ends.

Figure 5:
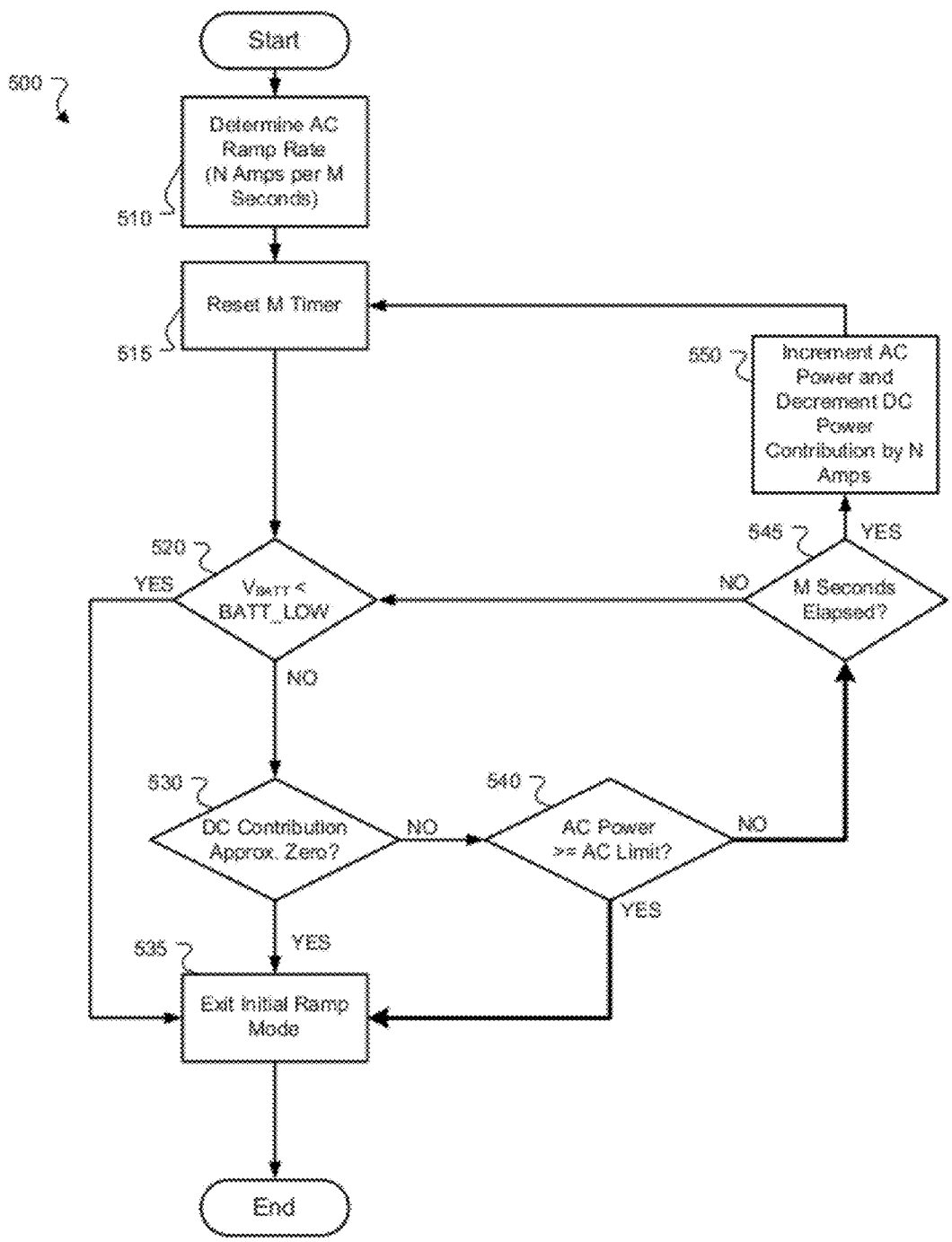

FIG. 5 is a flow diagram illustrating an exemplary process 500 that may be performed in implementations of the power distribution architecture. For example, the process 500 may be performed by the UPS 115 or 300. Generally, the process 500 includes operations that may be performed by a controller. In some implementations, the process 500 is performed as at least part of operation 402 of the process 400.

At operation 510, the controller determines an AC ramp rate, given for example, in units of N amps per M seconds. For example, the processor 316 may read the ramp rate value 344 to determine the value of N. At operation 515, a timer is reset to a time interval of M (e.g., M seconds).

At operation 520 the controller determines whether an output voltage of the battery (VBATT) is less than a battery low threshold (BATT_LOW). If so, then the initial ramp mode exits at operation 535. If not, then at operation 530 the controller determines whether the DC power contribution is approximately zero. If so, then the initial ramp mode exits at operation 535. If not, the process 500 continues at operation 540.

If at operation 540 the controller determines that the AC power contribution is at least equal to an AC limit, then the initial ramp mode exits at operation 535. For example, if the AC-to-DC conversion circuit 310 is drawing 100 A from the supply 302, and the UPS 300 is configured to draw a maximum of 100 A from the supply 302, then no further ramping is needed. In some implementations, the initial ramping process 500 may also end when the AC contribution is at least equal to the power draw of the DC loads 230. For example, the UPS 300 may be configured to draw a maximum of 100 A while the actual draw of the DC loads is 80 A. As such, the process 500 may end when the AC contribution reaches 80 A.

If at operation 540 the controller determines that the AC power contribution is less than an AC limit, then another determination is made at operation 545. If the controller determines that M seconds have not yet elapsed since operation 515 was performed, then operation 520 is performed again. If M seconds have elapsed, then the controller increments the AC power contribution and decrements the DC power contribution by N amps at operation 550, and operation 515 is repeated. For example, the IPM 306 may shift the burden of supplying power to the DC loads 230 from the battery system 312 to the AC-to-DC conversion circuit 310 by 2 amps every 15 seconds, until a predetermined 125 A maximum contribution limit is reached.

Figure 6:
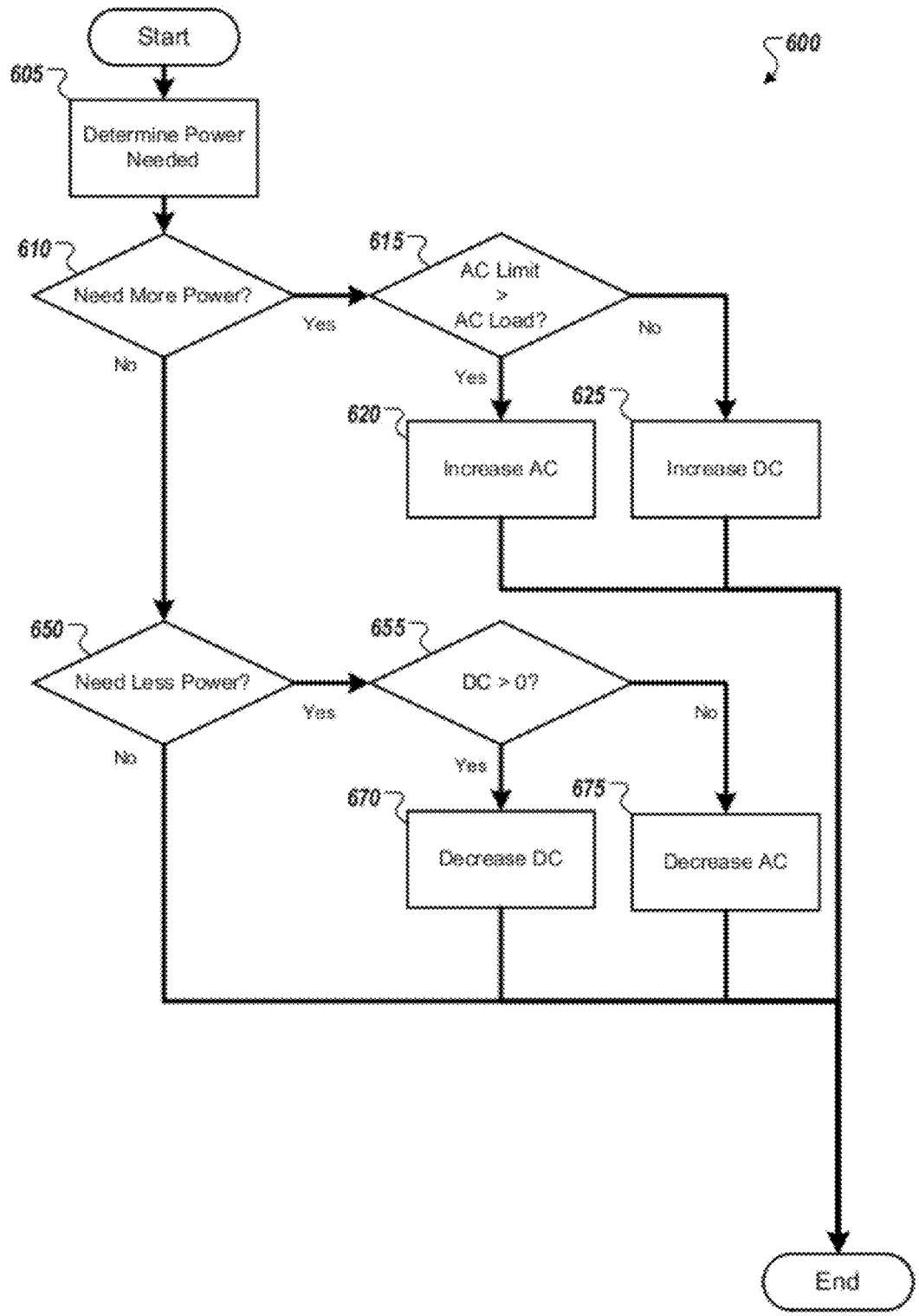

FIG. 6 is a flow diagram illustrating an exemplary process 600 that may be performed in implementations of the power distribution architecture. For example, the process 600 may be performed by the UPS 115 or 300. Generally, the process 600 includes operations that may be performed by a controller. In some implementations, the process 600 is performed as at least part of operations 410 and/or 425 of the process 400.

The process 600 starts at operation 605 when the controller determines the amount of power that is needed by a power consuming load. For example, the controller 245 can communicate with the DC loads 230 to request information that can be used to determine or estimate the amount of current that the DC loads 230 are likely to draw. If at operation 610 the controller determines that more power is needed to satisfy the determined need, then operation 615 is performed.

If at operation 615 the controller determines that a predefined AC power limit exceeds the AC load (e.g., the determined need), then at operation 620 the AC contribution to the amount of power supplied to the load is increased. For example, the ICM 306 can control the AC-to-DC conversion circuit 310 to draw more AC power from the supply 302 in order to increase the amount of DC power provided to the load 304, up to the predetermined AC power limit for the source 302. If the AC limit does not exceed the AC load, then the DC contribution is increased at operation 625. For example, the ICM 306 can control the Battery system 312 to increase the amount of DC power it provides to the load 304.

In some implementations, the AC limit is determined from a power quality signal. For example, the ICM 306 can use the sensor 309 to determine that the source 302 is malfunctioning (e.g., a brownout, excessively noisy, excessive power factor lead or lag), and based on this information can anticipate a possible power interruption by preemptively reducing the AC limit. In another example, the power quality signal may be provided to the ICM 306 by the power utility, to preemptively warn power consumers of an anticipated power problem. The ICM 306 can respond by preemptively reducing the AC limit and/or by requesting the load 304 to reduce its current draw (e.g., go to a low power state, begin a graceful shut down procedure).

If at operation 610 the controller determines that more power is not needed to satisfy the determined need, then operation 650 is performed. At operation 650, the controller determines if less power is needed to satisfy the determined need. If less power is not needed, then the process 600 ends. If less power is needed, then operation 655 is performed. If at operation 655 the controller determines that the amount of DC power being provided to satisfy the need is greater than zero, then at operation 670 the DC contribution to the amount of power supplied to the load is decreased. For example, the ICM 306 can control the battery system 312 to decrease the amount of DC power it provides to the load 304. If the amount of DC power being provided to satisfy the need is not greater than zero, then the AC contribution is decreased at operation 675. For example, the ICM 306 can control the AC-to-DC conversion circuit 310 to draw less AC power from the supply 302 in order to decrease the amount of DC power provided to the load 304.

In some implementations, the AC and/or DC contributions is reduced to zero. For example, the load can be shut down or powered off. Later, when the load is powered up again, the AC contribution can initially be at zero amps, and be transitioned gradually over a specified time period, supplemented by stored DC power, to provide a soft start functionality (e.g., as through the performance of the process 500 and/or 600).

In some implementations, the increase of AC at operation 620 and the decrease of AC at 675 is performed in predetermined increments. For example, the ramp rate value 344 can indicate that AC power draw should change at a rate of 5 A per minute, and the operations 620 and 675 can increase and decrease the AC contribution by amounts that substantially conform to the ramp rate value 344. In some examples, the increase of DC at operation 625 may be performed in increments substantially equal to the difference in the amount of power needed and the amount of power being provided by the AC and DC sources. For example, the UPS 300 can be operating under substantially "normal" conditions in which the load 304 is being powered substantially only by power converted from the source 302. If the DC load is suddenly increased, the DC contribution (e.g., provided by the Battery system 312) can be increased by an amount substantially equal to the increase in load. The next time the process 600 is performed, less power may be determined to be needed at operation 650, the DC contribution will be greater than zero at operation 655, and the DC contribution can be decreased at operation 670. Subsequent iterations of the process 600 can cause the AC contribution to be gradually increased (e.g., ramped) up to the needed power amount or up to the predetermined AC limit, and the DC contribution can be gradually decreased back down to zero.

Figure 7:
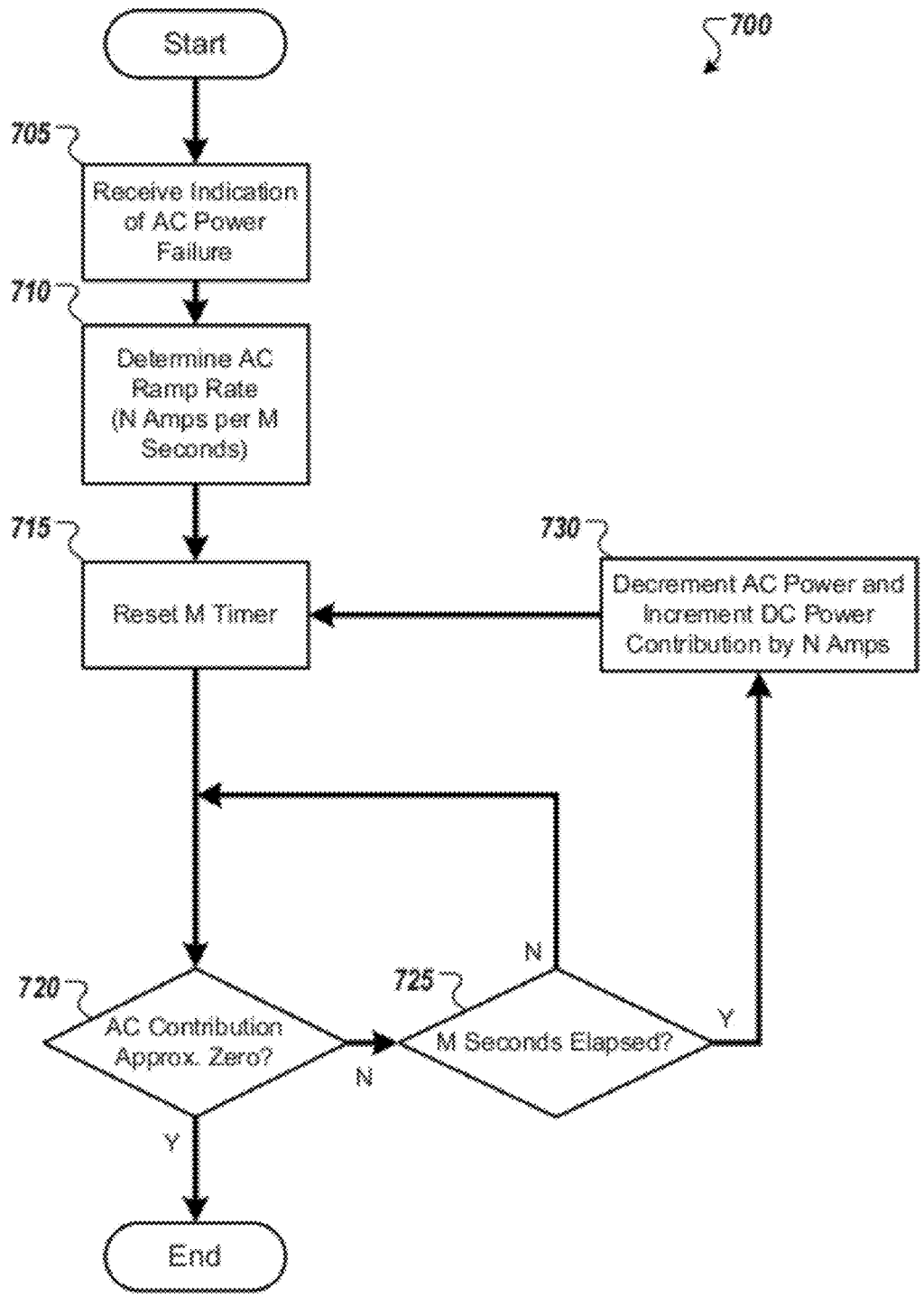

FIG. 7 is a flow diagram illustrating an exemplary process 700 that may be performed in implementations of the power distribution architecture. For example, the process 700 may be performed by the UPS 115 or 300. Generally, the process 700 includes operations that may be performed by a controller. In some implementations, the process 700 may be performed as at least part of operation 402 of the process 410.

In some implementations, the process 700 is performed to limit the rate at which a load is taken off a utility main and/or is presented to stored DC power. For example, the battery 185, when used as the source of stored DC power, may react adversely to sudden increases in load such if the UPS 115 were to suddenly switch utility mains 205 power to the battery system 180 power. In some cases, such sudden switchovers may be unavoidable (e.g., an unexpected blackout). In some cases, however, the controller can proactively control the rate at which a load is transferred away from AC power and presented to stored DC power. For example, the UPS 115 can receive an indication that a power outage or problem is about to occur (e.g., a message from the utility mains 205, an input from a data center operator, a sensed fluctuation in power across the AC bus 225), and in response, gradually switch the DC loads 230 over to receive power from the battery system 180.

The process 700 starts at operation 705 when the controller receives an indication of an AC power failure. For example, the ICM 306 can sense changes in the power signals carried by the source 302 that may be indicative of an impending power failure. In another example, the ICM 306 can receive an electronic notification from a utility provider as a warning about an upcoming power fluctuation or outage. In yet another example, a human operator can receive a verbal (e.g., telephone call), or written (e.g., letter, email, text message, instant message) indication from the utility provider as a warning about an upcoming power issue.

At operation 710, the controller determines an AC ramp rate, given for example, in units of N amps per M seconds. For example, the processor 316 may read the ramp rate value 344 to determine the value of N. At operation 715, a timer is reset to a time interval of M (e.g., M seconds).

At operation 720 the controller determines whether the AC contribution is approximately zero amps. For example, the processor 316 may determine whether or not current is being sensed by the sensor 309. If so, then the process 700 ends. If not, then another determination is made at operation 725.

If the controller determines that M seconds have not yet elapsed since operation 715 was performed, then operation 720 is performed again. If M seconds have elapsed, then the controller increments the DC power contribution and decrements the AC power contribution by N amps at operation 730, and operation 715 is repeated. For example, the ICM 306 may shift the burden of supplying power to the DC loads 230 from the battery system 312 to the AC-to-DC conversion circuit 310 by 2 amps every 15 seconds, until a predetermined 125 A maximum contribution limit is reached.

Figure 8:
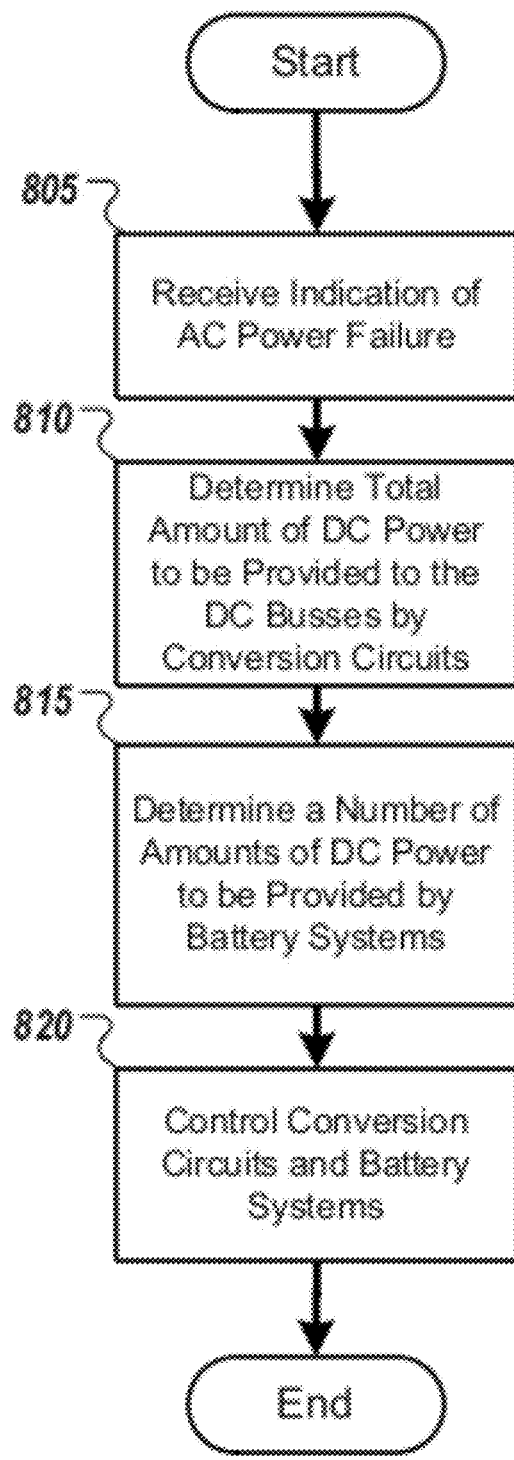

FIG. 8 is a flow diagram illustrating an exemplary process 800 that may be performed in implementations of the power distribution architecture. Generally, the process 800 includes operations that may be performed by a controller such as the power coordinator 127 of FIG. 1.

In some implementations, the process 800 is performed to coordinate the limiting of the amount of AC power consumed by a number of power consuming loads. For example, the power coordinator 127 may perform the process 800 to control the total amount of AC power drawn from the electric utility 130 to energize a number of DC busses 175 in the racks 125A-125C.

The process 800 starts at operation 805 when a controller receives an indication of an AC power failure. For example, the power coordinator 127 can sense changes in the power signals provided by the electric utility 130 that may be indicative of an impending power failure. In another example, the power coordinator 127 can receive an electronic notification from the electric utility 130 as a warning about an upcoming power fluctuation or outage. In yet another example, a human operator can receive a verbal (e.g., telephone call), or written (e.g., letter, email, text message, instant message) indication from the electric utility 130 as a warning about an upcoming power issue.

At operation 810, the controller determines a total amount of DC power to be provided to the DC busses by conversion circuits. At operation 815, the controller determines a total amount of DC power to be provided by battery systems. For example, the power coordinator 127 may receive a notification that the electric utility 130, which may typically supply 1000 A of AC power, is experiencing a problem and can only provide a reduced 700 A of AC power until the problem is resolved. The power coordinator 127 may also determine that the data center 105 is presently drawing 900 A of AC power. The power coordinator 127 may then analyze options for temporarily reducing the amount of power consumed by the data center 105 to 700 A or less. As such, the power coordinator 127 may determine that the UPSes 115 can be assigned to consume a total of 700 A from the electric utility 130, and utilize energy stored in the battery systems 180 to provide the remaining 200 A of power.

At operation 820, the controller controls the conversion circuits and the battery systems such that the conversion circuits provide the total amount of DC power to the DC buses and the battery systems concurrently provide the plurality of amounts of DC power to the DC buses. In some implementations, the controlling of the conversions circuits includes determining an AC limit for each of one or more conversion circuits, and requesting the conversion circuits use the determined AC limits in processes such as the processes 400, 500, 600, or 700.

In some implementations, options for controlling the conversion circuits includes utilizing DC power stored in the batteries 185 to supplement or replace power drawn from the electric utility 130, altering the power states of the motherboards 120, reducing the computing loads being handled by the motherboards 120, and combinations of these or other appropriate techniques for reducing the amount of power drawn from the electric utility 130. For example, the power coordinator 127 may identify trays 110 that include motherboards 120 with excess computing capacity that could be reduced or stopped (e.g., by limiting processor speeds, by powering down) and/or may identify UPSes 115 that are substantially fully charged (e.g., capable of supplementing DC power to the DC busses 175). In another example, the power coordinator 127 may identify trays 110 that are not good candidates for power reduction (e.g., trays 110 that host motherboards 120 that are handling critical computing loads, trays 110 that include UPSes 115 that are substantially discharged). Using these determinations, the power coordinator 127 may determine and request a number of battery power consumption rates for a number of UPSes 115, and/or a number of altered power states and computing load allocations for a number of motherboards 120. In some implementations, the power coordinator 127 periodically re-evaluates and re-configures these settings as AC power conditions, reserve battery levels, and computing requirements change over time.

Figure 9:
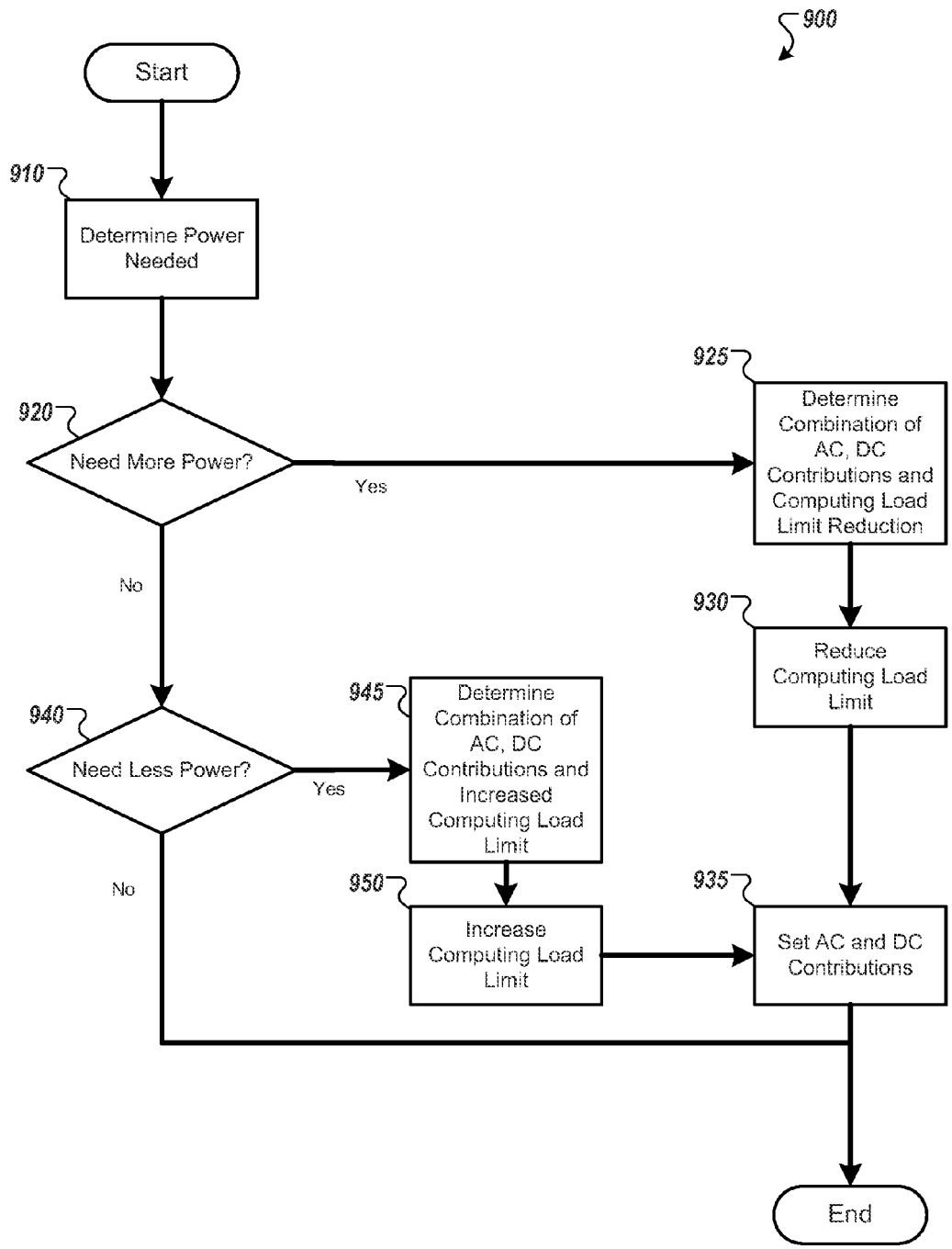

FIG. 9 is a flow diagram illustrating an exemplary process 900 that may be performed in implementations of the power distribution architecture. Generally, the process 900 includes operations that may be performed by a controller such as the power coordinator 127 of FIG. 1.

In some implementations, the process 900 is performed to coordinate the limiting of the amount of AC power consumed by a number of power consuming loads through a combination of stored DC power contributions and computing load limits. For example, the power coordinator 127 may perform the process 900 to temporarily reduce the total amount of AC power drawn from the electric utility 130 by drawing upon DC power stored in the battery 185 and/or by reducing the amount of computing load allocated to the motherboard 120.

The process 900 starts at operation 910 when a controller determines the amount of power that is needed by a power consuming load. For example, the power coordinator 127 can communicate with the motherboard 120 to request information that describes the motherboard's 120 computing load. The controller can use the computing load information to determine or estimate the amount of current that the motherboard 120 likely to draw.

If at operation 920, the controller determines that more power is needed, then at operation 925 the controller determines a combination of AC power draw, DC power draw, and computing load limit reduction. For example, the power coordinator 127 may determine that in order to limit the AC current draw of the tray 110 from 20 A to 10 A, the UPS 115 may be configured to draw 10 A from AC power and 5 A from the battery 185, while the motherboard 120 may be configured to reduce its power consumption by 5 A (e.g., reassigning computing loads to other motherboards, slowing the clock of the processor 160, powering down the hard drive 235).

At operation 930, the computing load limit is reduced. For example, the power coordinator 127 may transmit a load limit reduction request to the motherboard 120, and in response, the motherboard 120 may limit its computing load according to the reduced computing limit.

At operation 935, the AC and DC contributions are set. For example, the processes 400, 500, 600, 700, or 800 may be performed to set AC and DC current draws according to the AC and DC contributions determined during operation 925.

If at operation 920, the controller determines that more power is not needed, then at operation 940 another determination is made. If at operation 940, the controller determines that less power is needed, then at operation 945 the controller determines a combination of AC power draw, DC power draw, and an increase in the computing load limit. For example, the power coordinator 127 may determine that the AC current limit is 20 A while the UPS 115 may be configured to draw 10 A from AC power and 5 A from the battery 185, and the motherboard 120 may be configured to limit its power consumption to 15 A. In response, the power coordinator 127 may utilize the unused 10 A of AC current by reducing or eliminating the battery contribution and/or by increasing the computing load limit of the motherboard 120.

At operation 950, the computing load limit is increased. For example, the power coordinator 127 may transmit a load limit increase request to the motherboard 120, and in response, the motherboard 120 may limit its computing load according to the increased computing limit. At operation 935, the AC and DC contributions are set.

Figure 10:
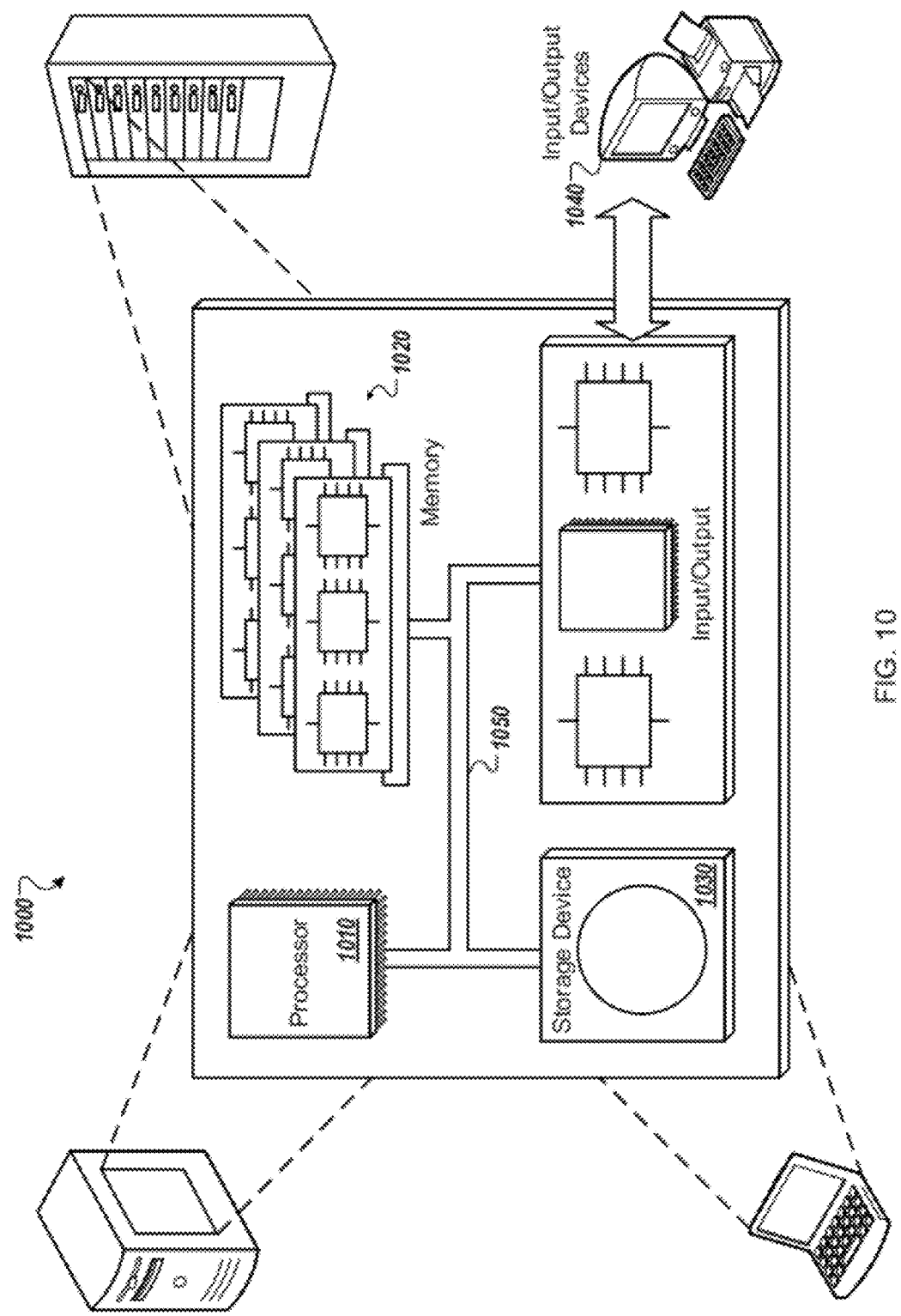
FIG. 10 is a schematic diagram of an example of a generic computer system.

FIG. 10 is a schematic diagram of an example of a generic computer system 1000. The system 1000 can be used for the operations described in association with method 400 according to one implementation. For example, the system 1000 may be included in either or all of the motherboard 120, the power coordinator 127, the charge/discharge control 210, the controller 245, and the intelligent control module 306.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. In some implementations, the memory 1020 is a computer-readable medium, operable to cause a data processing apparatus to perform operations for controlling a power distribution system.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. In some implementations, the storage device 1030 is a computer-readable medium, operable to cause a data processing apparatus to perform operations for controlling a power distribution system.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

What is claimed is:

1. A power distribution system, the system comprising:
a DC bus configured to deliver operating power to a DC load;
a conversion circuit configured to receive AC power and convert the received AC power to DC power that is provided to the DC bus;
a battery system configured to provide DC power from a battery to the DC bus; and,
a controller configured to determine a first amount of DC power to be provided to the DC bus by the conversion circuit, determine a second amount of DC power to be provided to the DC bus by the battery system while the first amount of DC power is provided to the DC bus by the conversion circuit, and control the conversion circuit and the battery system such that the conversion circuit provides the first amount of DC power to the DC bus and the battery system concurrently provides the second amount of DC power to the DC bus.

2. The system of claim 1 wherein the controller is configured to determine the first amount, determine the second amount, and control the conversion circuit and battery system as part of transitioning between a first state in which the conversion circuit is not providing DC power to the DC bus to a second state in which the conversion circuit provides a third amount of DC power to the DC bus, the third amount being greater than the first amount.

3. The system of claim 2 wherein the controller is configured to transition between the first state and the second state over a specified time period to prevent inrush currents from exceeding a predetermined level.

4. The system of claim 1 wherein the controller is configured to determine the first amount, determine the second amount, and control the conversion circuit and battery system as part of transitioning between a first state in which the battery system is not providing DC power to the DC bus to a second state in which the battery system provides a third amount of DC power to the DC bus, the third amount being greater than the second amount.

5. The system of claim 4 wherein the controller is configured to transition between the first state and the second state in response to an indication that a fault condition will occur in the received AC power.

6. The system of claim 1 wherein the controller is configured to determine the first amount and the second amount such that the operating power delivered to the DC load is sufficient to maintain operation of the DC load while maintaining an amount of the AC power converted to DC power by the conversion circuit below a predetermined level.

7. The system of claim 1 wherein the controller is configured to control the conversion circuit such that the conversion circuit provides the first amount of DC power to the DC bus by causing a power factor correction system in the conversion circuit to maintain current drawn from the received AC power below a predetermined level.

8. A method of controlling a power distribution system that includes a DC bus configured to deliver operating power to a DC load, a conversion circuit configured to receive AC power and convert the received AC power to DC power that is provided to the DC bus, and a battery system configured to provide DC power from a battery to the DC bus, the method comprising:
   determining a first amount of DC power to be provided to the DC bus by the conversion circuit;
   determining a second amount of DC power to be provided to the DC bus by the battery system while the first amount of DC power is provided to the DC bus by the conversion circuit; and
   controlling the conversion circuit and the battery system such that the conversion circuit provides the first amount of DC power to the DC bus and the battery system concurrently provides the second amount of DC power to the DC bus.

9. The method of claim 8 the method further comprising:
   controlling the conversion circuit such that the conversion circuit transitions from providing the first amount of DC power to providing a third amount of DC power to the DC bus, the third amount being greater than the first amount.

10. The method of claim 9 wherein the conversion circuit transitions from providing the first amount of DC power to providing the third amount of DC power over a specified time period to prevent inrush currents from exceeding a predetermined level.

11. The method of claim 9 wherein, prior to determining the first amount of DC power and determining the second amount of DC power, the conversion circuit is not providing DC power to the DC bus.

12. The method of claim 8 further comprising:
   controlling the battery system such that the battery system transitions from providing the second amount of DC power to providing a third amount of DC power to the DC bus, the third amount being greater than the second amount.

13. The method of claim 12 wherein determining the first amount of DC power and determining the second amount of DC power are performed in response to an indication that a fault condition will occur in the received AC power.

14. The method of claim 12 wherein, prior to determining the first amount of DC power and determining the second amount of DC power, the battery system is not providing DC power to the DC bus.

15. The method of claim 8 wherein the first amount and the second amount are determined such that the operating power delivered to the DC load is sufficient to maintain operation of the DC load while maintaining an amount of the AC power converted to DC power by the conversion circuit below a predetermined level.

16. The method of claim 8 wherein controlling the conversion circuit such that the conversion circuit provides the first amount of DC power to the DC bus includes causing a power factor correction system in the conversion circuit to maintain current drawn from the received AC power below a predetermined level.

17. A power distribution system, the system comprising:
   a plurality of DC buses configured to deliver operating power to a plurality of DC loads;
   a plurality of conversion circuits, each conversion circuit configured to receive AC power and convert the received AC power to DC power that is provided to a corresponding ones of the DC buses;
   a plurality of battery systems, each battery system including a respective battery and configured to provide DC power from the respective battery to a corresponding one of the DC buses; and,
   a power coordinator configured to determine a total amount of DC power to be provided to the DC buses by the plurality of conversion circuits, determine a plurality of amounts of DC power to be provided to the DC buses by the battery systems while the total amount of DC power is provided to the DC buses by the conversion circuits, and control the conversion circuits and the battery systems such that the conversion circuits provide the total amount of DC power to the DC buses and the battery systems concurrently provide the plurality of amounts of DC power to the DC buses.

18. The system of claim 17 wherein the power coordinator is configured to determine the total amount of DC power and the plurality of amounts of DC power such that the operating power delivered to the DC loads is sufficient to maintain operation of the DC loads while maintaining an amount of the AC power converted to DC power by the conversion circuits below a predetermined level.

19. The system of claim 17 wherein the power coordinator is configured to control the conversion circuits such that the conversion circuits provide the total amount of DC power to the DC buses by causing a plurality of power factor correction systems in the conversion circuits to maintain total current drawn from the received AC power below a predetermined level.

20. The system of claim 17 wherein the power coordinator is configured to determine, for each of the plurality of conversion circuits, a respective first amount of operating power that is to be provided to the conversion circuits such that the operating power delivered to the DC loads is sufficient to maintain operation of the DC loads while maintaining an amount of the AC power converted to DC power by the conversion circuits below a predetermined level.

21. The system of claim 20 wherein the power coordinator is configured to, in response to an increased operating power requirement for a first group of one or more of the conversion circuits, determine a magnitude of the increased power requirement, identify a second group of one or more other conversion circuits that are using less than their respective first amounts of operating power, and reallocate power from the second group to the first group such that the operating power delivered to the DC loads is sufficient to maintain operation of the DC loads while maintaining an amount of the AC power converted to DC power by the conversion circuits below a predetermined level.

22. A method of controlling a power distribution system that includes a plurality of DC buses configured to deliver operating power to a plurality of DC loads, a plurality of conversion circuits configured to receive AC power and convert the received AC power to DC power that is provided to the DC buses, and a plurality of battery systems, each battery system including a respective battery and configured to provide DC power from the respective battery to a corresponding one of the DC buses, the method comprising:
  determining, by a power coordinator, a first total amount of DC power to be provided to the DC buses by the plurality of conversion circuits;
  determining a plurality of amounts of DC power to be provided to the DC buses by the battery systems while the first total amount of DC power is provided to the DC buses by the conversion circuits; and
  controlling the conversion circuits and the battery systems such that the conversion circuits provide the first total amount of DC power to the DC buses and the battery systems concurrently provide the plurality of amounts of DC power to the DC buses.

23. The method of claim 22 the method further comprising:
  controlling the conversion circuits such that the conversion circuits transition from providing the first total amount of DC power to providing a second total amount of DC power to the DC buses, the second total amount being greater than the first total amount.

24. The method of claim 23 wherein the conversion circuits transition from providing the first total amount of DC power to providing the second total amount of DC power over a specified time period to prevent inrush currents from exceeding a predetermined level.

25. The method of claim 23 wherein, prior to determining the first total amount of DC power and determining the plurality of amounts of DC power, the conversion circuits are not providing DC power to the DC buses.

26. The method of claim 22 further comprising:
  controlling the battery systems such that the battery systems transition from providing the plurality of amounts of DC power to providing a second total amount of DC power to the DC buses, the second total amount being greater than the plurality of amounts.

27. The method of claim 26 wherein determining the first total amount of DC power and determining the plurality of amounts of DC power are performed in response to an indication that a fault condition will occur in the received AC power.

28. The method of claim 26 wherein, prior to determining the first total amount of DC power and determining the plurality of amounts of DC power, the battery systems are not providing DC power to the DC buses.

29. The method of claim 22 wherein the first total amount and the plurality of amounts are determined such that the operating power delivered to the DC loads is sufficient to maintain operation of the DC loads while maintaining an amount of the AC power converted to DC power by the conversion circuits below a predetermined level.

30. The method of claim 22 wherein controlling the conversion circuits such that the conversion circuits provide the first total amount of DC power to the DC buses includes causing a plurality of power factor correction systems in the conversion circuits to maintain current drawn from the received AC power below a predetermined level.

* * * * *